United States Patent
Nir et al.

(12) 
(10) Patent No.: US 6,285,809 B1
(45) Date of Patent: Sep. 4, 2001

(54) WRAPAROUND OPTICAL SWITCH MATRIX

(75) Inventors: David Nir, Tel Aviv; Reuven Duer, Moshav Talmei Elazar, both of (IL)

(73) Assignee: Lynx Photonic Networks, Inc., Calabasas Hills, CA (US)

( * ) Notice: Subject to any disclaimer, the term of this patent is extended or adjusted under 35 U.S.C. 154(b) by 0 days.

(21) Appl. No.: 09/696,224

(22) Filed: Oct. 26, 2000

Related U.S. Application Data

(60) Provisional application No. 60/166,312, filed on Nov. 19, 1999.

(51) Int. Cl.[7] .................................................. G02B 6/06
(52) U.S. Cl. ................................. 385/17; 385/16
(58) Field of Search ................................. 385/15, 16, 17, 385/18, 19

(56) References Cited

U.S. PATENT DOCUMENTS

| | | | |
|---|---|---|---|
| 4,852,958 | 8/1989 | Okuyama et al. | 385/17 |
| 6,151,431 | * 11/2000 | White | 385/21 |
| 6,160,928 | 12/2000 | Schroeder | 385/18 |

OTHER PUBLICATIONS

"Mach–Zehnder Interferometer", http://faraday.physics.u-toronto.ca/Gener . . . st/Harrison/MachZender. MachZenderhtml, May 11, 2000.

* cited by examiner

*Primary Examiner*—Phan T. H. Palmer
(74) *Attorney, Agent, or Firm*—Mark M. Friedman

(57) ABSTRACT

An optical switch matrix connects N input waveguides to M output waveguides via M rows of switch sets. Each row of switch sets includes a first switch set that has one input port and two output ports, N−2 intermediate switch sets that have two input ports and two output ports, and a last switch set that has two input ports and one or two output ports. One output port of each first or intermediate switch set is optically coupled to an input port of a succeeding switch set in the same row, and the other output port is optically coupled to an input port of a respective switch set in a cyclically succeeding row, by intermediate waveguides that do not cross each other. The only exceptions are the intermediate waveguides that connect the last row to the first row. These intermediate waveguides may cross other waveguides. Preferably, however, no intermediate waveguides cross each other: the intermediate waveguides that connect the last row to the first row either cross the input waveguides or cross the output waveguides or cross no waveguides. Preferably, each switch set includes a 1×2 switch and a 2×1 combiner coupled optically to each other and to the input and output ports of the switch set. Optionally, in an N×N optical switch matrix, yet another switch set with two input ports and one output port is appended to each of L<N−1 of the rows, starting from the next to last row and working upwards. The first L switch sets of the last row are optically coupled to respective appended switch sets instead of to respective switch sets of the first row.

30 Claims, 14 Drawing Sheets

WRAPAROUND OPTICAL SWITCH MATRIX

This application claims benefit of Provisional No. 60/166,312 filed Nov. 19, 1999.

FIELD AND BACKGROUND OF THE INVENTION

The present invention relates to optical switch matrices and, more particularly, to an improved optical switch matrix with wraparound architecture FIG. 1 illustrates the prior art optical switch matrix 10 of which the present invention is an improvement. This prior art optical switch matrix also is described as prior art in U.S. Pat. No. 4,852,958, to Okuyama et al. Matrix 10 connects four input waveguides 18 to four output waveguides 20 via four rows (a, b, c, d) of switches. Each row includes a 1×2 switch 12, two 2×2 switches 14 and a 2×1 combiner 16. Each 1×2 switch 12 has a single input port 40 and two output ports: an upper output port 22 and a lower output port 24. Each 2×2 switch has two input ports and two output ports: an upper input port 26, a lower input port 28, an upper output port 30 and a lower output port 32. Each 2×1 combiner has two input ports: an upper input port 34 and a lower input port 36; and a single output port 42. Input waveguides 18 are connected to corresponding input ports 40. Output waveguides 20 are connected to corresponding output ports 42. In each row, lower output ports 24 and 32 are connected by intermediate waveguides 38 to lower input ports 28 and 36 of the immediately succeeding switches 14 or 16; whereas upper output ports 22 and 30 are connected by intermediate waveguides 38 to upper input ports 26 or 34 of respective switches 14 or 16 in the cyclically succeeding row. Cyclical succession means that the connection topology is as though the rows were fabricated on the periphery of a cylinder, parallel to the axis of the cylinder: row b is the successor of row a, row c is the successor of row b, row d is the successor of row c and row a is the successor of row d. So, for example, an intermediate waveguide 38 connects upper output port 22 of switch 12d to upper input port 26 of switch 14aa. In Okuyama et al., rows a and d are shown connected by intermediate waveguides 38 that cross other intermediate waveguides 38. For illustrational clarity, this wraparound of the connectivity between rows a and d is represented in FIG. 1 by the circled terminations A, B and C on intermediate waveguides 38 that connect output ports 22 and 30 in row d to input ports 26 and 34 in row a.

Several implementations of 2×2 switches 14 are known in the prior art, including, among others, directional coupler switches and Mach-Zehnder interferometer switches. A 2×2 switch 14 can be in one of two states: a straight-through state (also called the "bar" state or the "=" state), in which optical energy, that enters switch 14 via upper input port 26, exits switch 14 via upper output port 30, and in which optical energy, that enters switch 14 via lower input port 28, exits switch 14 via lower output port 32; and a crossover state (also called the "cross" state or the "X" state") in which optical energy, that enters switch 14 via upper input port 26, exits switch 14 via lower output port 32, and in which optical energy, that enters switch 14 via lower input port 28, exits switch 14 via upper output port 30. Switch 14 is switched from one state to another by the application of a voltage to an internal component of switch 14. With no voltage applied, switch 14 is "OFF" in one of its two states. With the switching voltage applied, switch 14 is "ON" in the other of its two states. Two variants of switch 14 thus are possible. In the first variant, switch 14 is in its=state when OFF and in its X state when ON. In the second variant, switch 14 is in its X state when OFF and in its=state when ON. In the context of the present invention, the first variant of switch 14 is preferred.

2×2 switch 14 is turned into a 1×2 switch 12 simply by making one of the input ports an idle port, ie., leaving this input port disconnected. For example, if lower input port 28 is idle, then upper input port 26 serves as input port 40, upper output port 30 serves as upper output port 22 and lower output port 32 serves as lower output port 24. In the preferred variant of such a 1×2 switch 12, when this switch 12 is OFF, it is in its=state, so that optical energy entering via input port 40 leaves via upper output port 22; and when this switch 12 is ON, it is in its X state, so that optical energy entering via input port 40 leaves via lower output port 24. Alternatively, if input port 26 is idle, then lower input port 28 serves as input port 40. In the preferred variant of this alternative 1×2 switch 12, when this switch 12 is OFF, it is in its=state, so that optical energy entering via input port 40 leaves via lower output port 24, and when this switch 12 is ON, it is in its X state, so that optical energy entering via input port 40 leaves via upper output port 22.

2×1 combiners 16 may be either passive or active. 2×2 switch 14 is turned into a 2×1 active combiner 16 simply by malting one of the output ports an idle port, i.e., leaving this output port disconnected. For example, if lower output port 32 is idle, then upper input port 26 serves as upper input port 34, lower input port 28 serves as lower input port 36, and upper output port 30 serves as output port 42. In what follows, an active 2×1 combiner usually is referred to as a "2×1 switch". In the preferred variant of such a 2×1 switch 16, when this 2×1 switch 16 is OFF, it is in its=state, so that only optical energy entering via upper input port 34 leaves via output port 42; and when this 2×1 switch 16 is ON, it is in its X state, so that only optical energy entering via lower input port 36 leaves via output port 42. Alternatively, if upper output port 30 is idle, then lower output port 32 serves as output port 42. In the preferred variant of this alternative 2×1 switch 16, when this 2×1 switch 16 is OFF, it is in its=state, so that only optical energy entering via lower input port 36 leaves via output port 42, and when this 2×1 switch 16 is ON, it is in its X state, so that only optical energy entering via upper input port 34 leaves via output port 42. Although 2×1 combiners 16 are most simply implemented as passive combiners, such as y-junction combiners, the preferred 2×1 combiners of the present invention are active 2×1 combiners, both because passive 2×1 combiners are inherently lossy and for a second reason describe below.

By turning appropriate switches 12 and 14 ON and OFF, any input waveguide 18 may be connected to any output waveguide 20. For example, let 1×2 switches 12 be 2×2 switches with idle lower input ports, let 1×2 switches 12 and 2×2 switches 14 be in their=states when OFF and in their X states when ON, and let 2×1 combiners 16 be passive. With all switches 12 and 14 OFF, input waveguide 18a is connected to output waveguide 20d, input waveguide 18b is connected to output waveguide 20a, input waveguide 18c is connected to output waveguide 20b, and input waveguide 18d is connected to output waveguide 20c. Turning switch 12a ON connects input waveguide 18a to output waveguide 20a. Turning switch 14ba ON connects input waveguide 18a to output waveguide 20b. Turning switch 14cb ON connects input waveguide 18a to output waveguide 20c.

By using active 2×1 combiners 16, optical switch matrix 10 may be configured so that no input waveguide 18 is connected to any output waveguide 20 unless a switch 12, 14 or 16 is turned ON. For example, let 1×2 switches 12 and 2×2 switches 14 be as above, and let 2×1 combiners 16 be 2×2 switches, with idle upper output ports, that are in their=states when OFF and in their X states when ON. Now, with all switches 12 and 14 OFF, switch 16*d* must be turned ON to connect input waveguide 18*a* to output waveguide 20*d*, switch 16*a* must be turned ON to connect input waveguide 18*b* to output waveguide 20*a*, switch 16*b* must be turned ON to connect input waveguide 18*c* to output waveguide 20*b*, and switch 16*c* must be turned ON to connect input waveguide 18*d* to output waveguide 20*c*.

SUMMARY OF THE INVENTION

According to the present invention there is provided an optical switch matrix including: (a) N input waveguides, N being an integer greater than 2; (b) M output waveguides, M being an integer greater than 2; and (c) K rows of switch sets, where K is a larger of M and N, including: (i) a first switch set having at least one input port and two output ports, (ii) a last switch set having two input ports and at least one output port, and (iii) L−2 intermediate switch sets, where L is a lesser of M and N, each intermediate switch set having two input ports and two output ports; wherein one of the at least one input ports of each of N of the first switch sets is optically coupled to a respective input waveguide; wherein one of the at least one output ports of each of M of the last switch sets is optically coupled to a respective output waveguide; wherein, for each row, for each switch set other than the last switch set, a first output port of the each switch set is optically coupled via a first respective intermediate waveguide to a respective input port of a succeeding switch set, and a second output port is optically coupled via a second respective intermediate waveguide to a respective input port of a respective switch set of a cyclically succeeding row; and wherein, for each row other than a last row: for each switch set other than the last switch set, the first and second intermediate waveguides avoid each other.

According to the present invention there is provided an optical switch matrix including: (a) N input waveguides, N being an integer greater than 2; (b) N output waveguides; and (c) N rows of switch sets, all N rows including: (i) a first switch set having one input port and two output ports, the input port of the first switch set being optically coupled to a respective input waveguide, (ii) a penultimate switch set having two input ports and one output port, the output port of the penultimate switch set of a last row being optically coupled to a respective output waveguide, and (iii) N−2 intermediate switch sets, each intermediate switch set having at least one input port and two output ports, the intermediate switch sets and the penultimate switch set of each of a last N−1 rows each having two input ports, each of a last L of a first N−1 rows, where L is an integer less than N−1, further including: (iv) a last switch set having two input ports and one output port, the output port of the last switch set being optically coupled to a respective output waveguide, a first input port of the last switch set being optically coupled to the output port of the penultimate switch set of the each row; wherein the output ports of the penultimate switch sets of a first N−L−1 of the rows are optically coupled to respective output waveguides; wherein, for each row, for each switch set selected from the group consisting of the first switch set of the each row and the N−2 intermediate switch sets of the each row, a first output port of the each switch set is optically coupled via a first respective intermediate waveguide to a respective input port of a succeeding switch set; wherein, for each of the first N−1 rows, for each switch set selected from the group consisting of the first switch set of the each row and the N−2 intermediate switch sets of the each row, a second output port of the each switch set is optically coupled via a second respective intermediate waveguide to a respective input port of a respective switch of a succeeding row; and wherein, in the last row, for each of a first L switch sets, a second output port of the each switch set is optically coupled to a second input port of a respective last switch set.

FIG. 2 illustrates an optical switch matrix 100 of the present invention. Matrix 100 connects four input waveguides 118 to four output waveguides 120 via four rows (a, b, c, d) of switch sets 112, 114 and 116. Each switch set includes one or more switches such as 1×2 switches, 2×1 combiners or 2×2 switches. The first (input) switch set 112 of each row is a 1×2 switch. In the simplest preferred embodiment of matrix 100, each of the intermediate switch sets 114 is a 2×2 switch, but other configurations are possible, as described below. The last (output) switch set 116 of each row is a 2×1 switch. Each 1×2 switch 112 has a single input port 140 and two output ports, an upper output port 122 and a lower output port 124. Each intermediate switch set 114 has two input ports and two output ports: an upper input port 126, a lower input port 128, an upper output port 130 and a lower output port 132. Each 2×1 switch 116 has two input ports, an upper input port 134 and a lower input port 136, and a single output port 142. Input waveguides 118 are connected to corresponding input ports 140. Output waveguides 120 are connected to corresponding output ports 142. In each row, upper output ports 122 and 130 are connected by intermediate waveguides 138 to lower input ports 128 and 136 of the immediately succeeding switch sets 114 or 116; whereas lower output ports 124 and 132 are connected by intermediate waveguides 138 to upper input ports 126 or 134 of respective switch sets 114 or 116 in the cyclically succeeding row. As in prior art matrix 10, this connectivity to the cyclically succeeding row wraps around to connect rows a and d, as represented in FIG. 2 by the circled terminations A, B and C on intermediate waveguides 138 that connect output ports 124 and 132 in row d to input ports 126 and 134 in row a.

1×2 switches, such as are used as switch sets 112, also are termed herein "active 1×2 splitters".

The lack of relatively low angle intra-row crossings of intermediate waveguides 138 in matrix 100 gives matrix 100 far lower loss than matrix 10. As noted above, in Okuyama et al., prior art optical switch matrix 10 is illustrated as having intermediate waveguides 38 that connect row d to row a by crossing other intermediate waveguides 38. The scope of the present invention includes a planar embodiment of matrix 100 with similar wraparound connectivity, but now the only intersections of intermediate waveguides 138 in such an embodiment of matrix 100 are intersections that involve intermediate waveguides 138 that connect rows a and d. These intersections typically are at high angles and so are characterized by low loss. All other intermediate waveguides 138 avoid each other. Preferably, however, intermediate waveguides 138 that connect rows a and d do not cross other intermediate waveguides 138 at all, so that all intermediate waveguides 138 avoid each other. Instead, intermediate waveguides 138 that connect rows a and d cross either input waveguides 118 or output waveguides 120, at angles of approximately 90 degrees. Similarly, in an embodiment of matrix 100 that is fabricated on a surface with suitable periodic boundary conditions, such as the side of a cylinder, all intermediate waveguides 138 avoid each other without having to cross input waveguides 118 or output waveguides 120. As yet another alternative, in an embodiment of matrix 100 that is otherwise fabricated in a single common plane, intermediate waveguides 138 that connect rows a and d rise above the plane and so do not cross any other waveguides.

As noted above, it is preferable that switch sets 116 be active. If switch sets 112 are 2×2 switches, with idle lower input ports, that are configured to be ON in their=states, passing optical energy from input ports 140 to output ports 122, and OFF in their X states, passing optical energy from input ports 140 to output ports 124; if switch sets 114 are configured to be ON in their=states, passing optical energy from input ports 126 to output ports 130 and from input ports 128 to output ports 132, and OFF in their X states, passing optical energy from input ports 126 to output ports 132 and from input ports 128 to output ports 130; and if switch sets 116 are 2×2 switches, with idle lower output ports, that are configured to be ON in their=states, passing optical energy from input ports 134 to output ports 142, and OFF in their X states, passing optical energy from input ports 136 to output ports 142; then the algorithm for deciding which switch group to turn ON to achieve a desired connectivity between input waveguides 118 and output waveguides 120 is as simple as in the prior art. Starting with all switch sets 112 and 114 OFF, turning ON one of switch sets 116 connects an input waveguide 118 to the output waveguide 120 at the other end of the diagonal of matrix 100 into which that input waveguide 118 enters: turning on switch set 116d connects input waveguide 118a to output waveguide 120d, turning on switch set 116a connects input waveguide 118b to output waveguide 120a, turning on switch set 116b connects input waveguide 118c to output waveguide 120b, and turning on switch set 116c connects input waveguide 118d to output waveguide 120c. To connect one of input waveguides 118 to a different output waveguide 120, it suffices to turn ON only one switch set 112 or 114 with all switch sets 116 OFF. For example, to connect input waveguide 118a to output waveguide 120a, switch set 112a is turned ON; to connect input waveguide 118a to output waveguide 120b, switch set 114ba is turned ON; and to connect input waveguide 118a to output waveguide 120c, switch set 114cb is turned ON. Note that in all cases, it suffices to turn ON only one switch set 112, 114 or 116 to connect any one input waveguide 118 to any one output waveguide 120. Optical energy entering matrix 100 from any input waveguide 118 travels along a diagonal of matrix 100 until the switch set 112, 114 or 116 that has been turned ON diverts the optical energy to the corresponding row of matrix 100.

The same algorithm applies to an alternative embodiment of matrix 100 in which switch sets 114 are configured to always pass optical energy from input ports 128 to output ports 130 and to pass optical energy from input ports 126 to output ports 132 when OFF and from input ports 126 to output ports 130 when ON.

Similarly, in another alternative embodiment of matrix 100 in which switch sets 112 are configured to pass optical energy from input ports 140 to output ports 122 when OFF in their=states and to output ports 124 when ON in their X states, in which switch sets 114 are configured to always pass optical energy from input ports 126 to output ports 132 and to pass optical energy from input ports 128 to output ports 130 when OFF and to output ports 132 when ON, and in which switch sets 116 are configured to pass optical energy from input ports 134 to output ports 142 when OFF in their=states and from input ports 136 to output ports 142 when ON in their X states, the algorithm for deciding which switch group to turn ON to achieve a desired connectivity between input waveguides 118 and output waveguides 120 is equally simple. When all switch sets 112 and 114 are OFF, turning ON one of switch sets 116 connects a corresponding input waveguide 118 to its default output waveguide 120: turning on switch set 116a connects input waveguide 118a to output waveguide 120a, turning on switch set 116b connects input waveguide 118b to output waveguide 120b, turning on switch set 116c connects input waveguide 118c to output waveguide 120c, and turning on switch set 116d connects input waveguide 118d to output waveguide 120d, To connect one of input waveguides 118 to a different output waveguide 120, it again suffices to turn ON only one switch set 112 or 114 with all switch sets 116 OFF. For example, to connect input waveguide 118a to output waveguide 120b, switch set 114ab is turned ON; to connect input waveguide 118a to output waveguide 120c, switch set 114aa is turned ON; and to connect input waveguide 118a to output waveguide 120d, switch set 112a is turned ON.

As exemplified in more detail below, a matrix of the present invention can be configured to connect a certain number of input waveguides 118 to a different number of output waveguides 120, essentially by eliminating unneeded switch groups 112, 114 and 116 along diagonals of the matrix, to produce, for N input waveguides 118 and M output waveguides 120, an array having max(M,N) rows of min(M,N) switch groups 112, 114 and/or 116 each. Note, however, that both M and N must in any case be greater than 2.

In the alternative embodiments of matrix 100, each switch set 114 includes an active 1×2 switch and a 2×1 combiner. In one such embodiment, one input port of the 2×1 combiner serves as, or is optically coupled to, upper input port 126 of switch set 114; the input port of the 1×2 switch serves as, or is optically coupled to, lower input port 128 of switch set 114; one output port of the 1×2 switch serves as, or is optically coupled to, upper output port 130 of switch set 114; and the output port of the 2×1 combiner serves as, or is optically coupled to, lower output port 132 of switch set 114. In another such embodiment, the input port of the 1×2 switch serves as, or is optically coupled to, upper input port 126 of switch set 114; one input port of the 2×1 combiner serves as, or is optically coupled to, lower input port 128 of switch set 114; the output port of the 2×1 combiner serves as, or is optically coupled to, upper output port 130 of switch set 114; and one output port of the 1×2 switch serves as, or is optically coupled to, lower output port 132 of switch set 114. In both cases, the remaining output port of the 1×2 switch is optically coupled to the remaining input port of the 2×1 combiner.

According to a second aspect of the present invention, an N×N optical switch matrix such as matrix 100 is enhanced by appending another 2×1 switch set to L<N−1 of the rows, starting from the next to last row and working upwards. The former "last switch sets" (in the case of 4×4 matrix 100, switch sets 116) then are considered to be "penultimate" switch sets. The first L switch sets of the last row, instead of being optically coupled to respective switch sets of the first row, are optically coupled to respective newly appended "last" switch sets.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an optical switch matrix which can be used to switch optical signals from input waveguides to output waveguides in a non-blocking manner, with relatively low loss and with high extinction ratios.

The principles and operation of an optical switch matrix according to the present invention may be better understood with reference to the drawings and the accompanying description.

Figure 1:
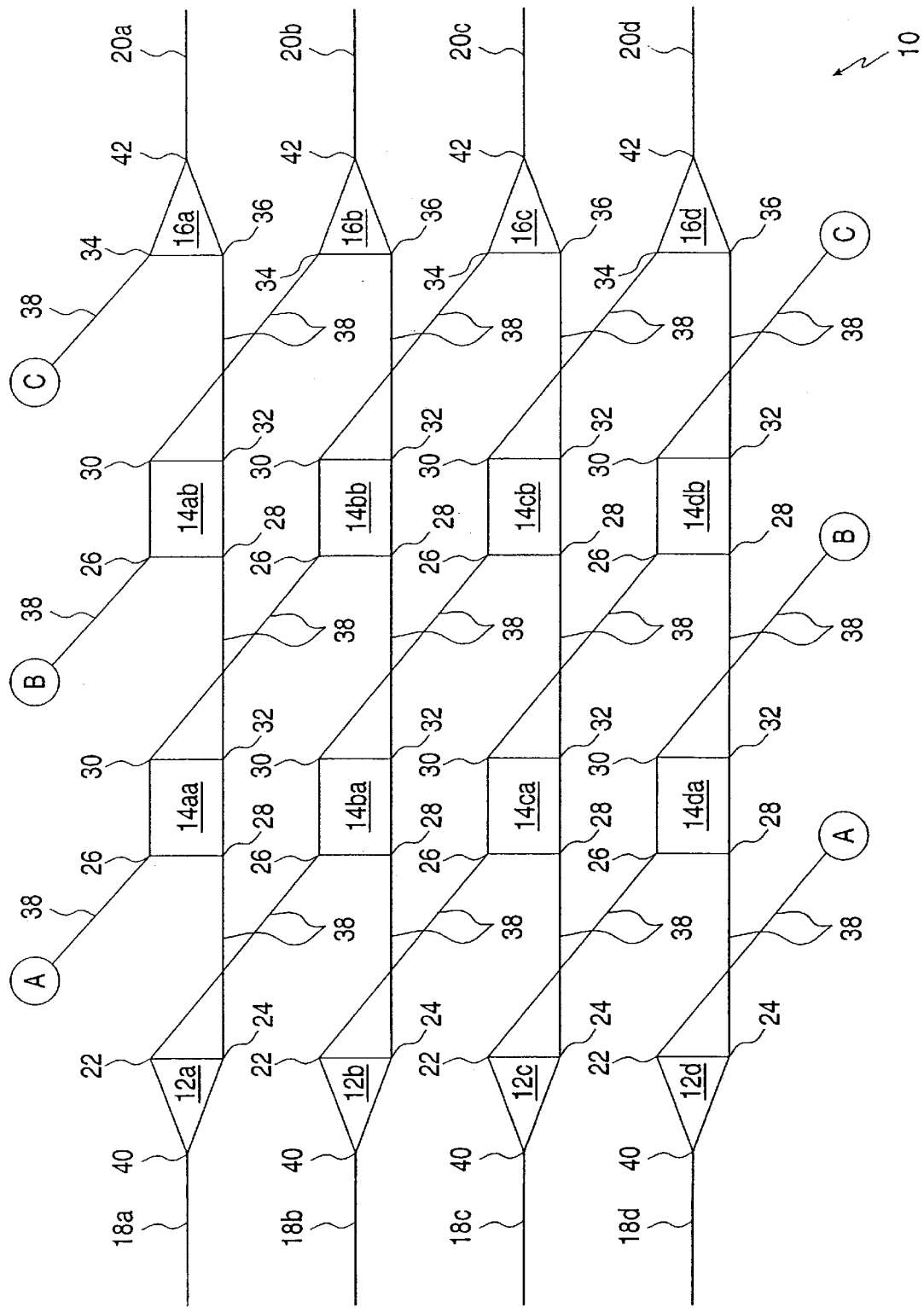
FIG. 1 illustrates a prior art optical switch matrix.
Figure 2:
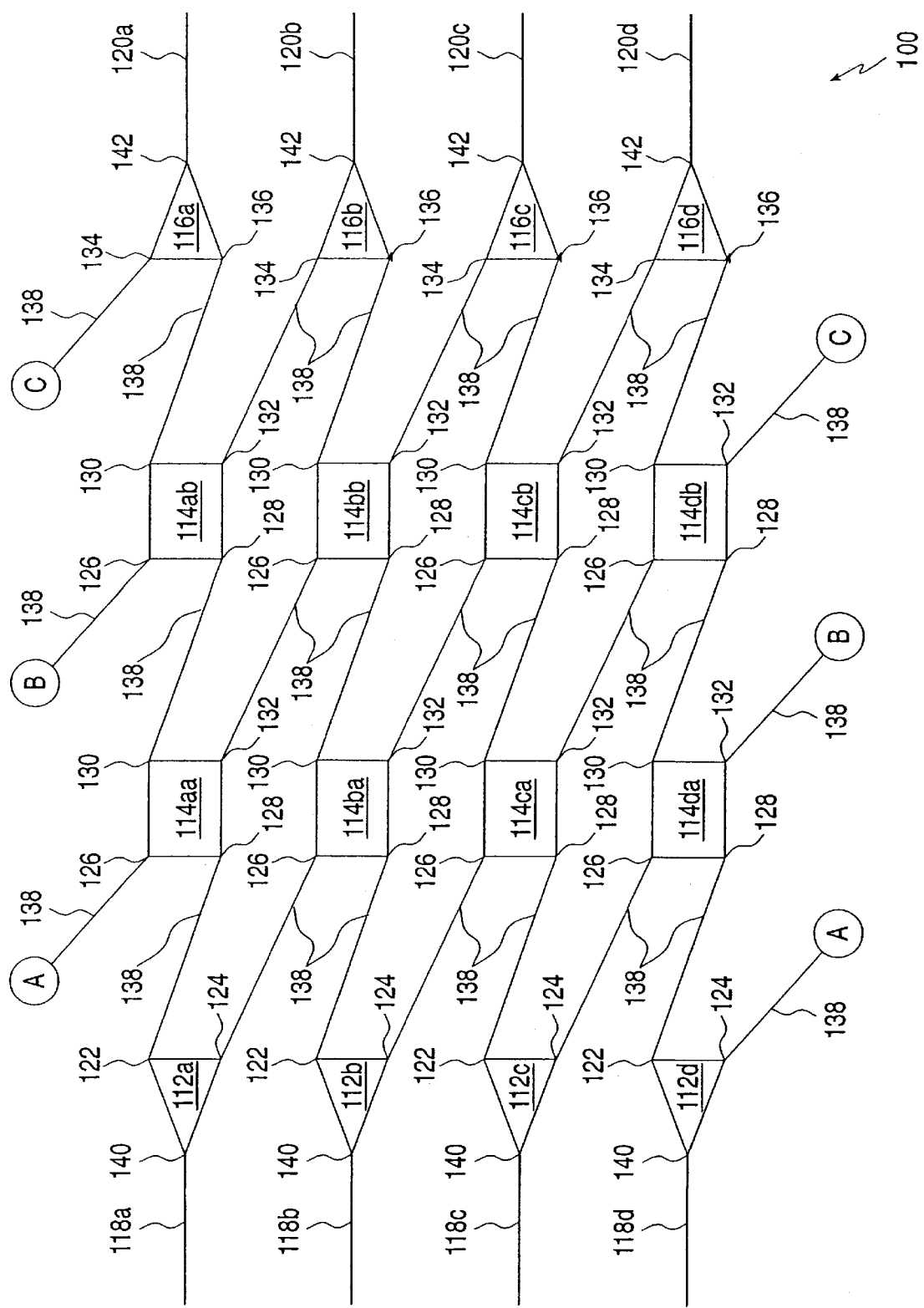
FIG. 2 illustrates an optical switch matrix of the present invention, for connecting four input waveguides to four output waveguides.
Figure 3A:
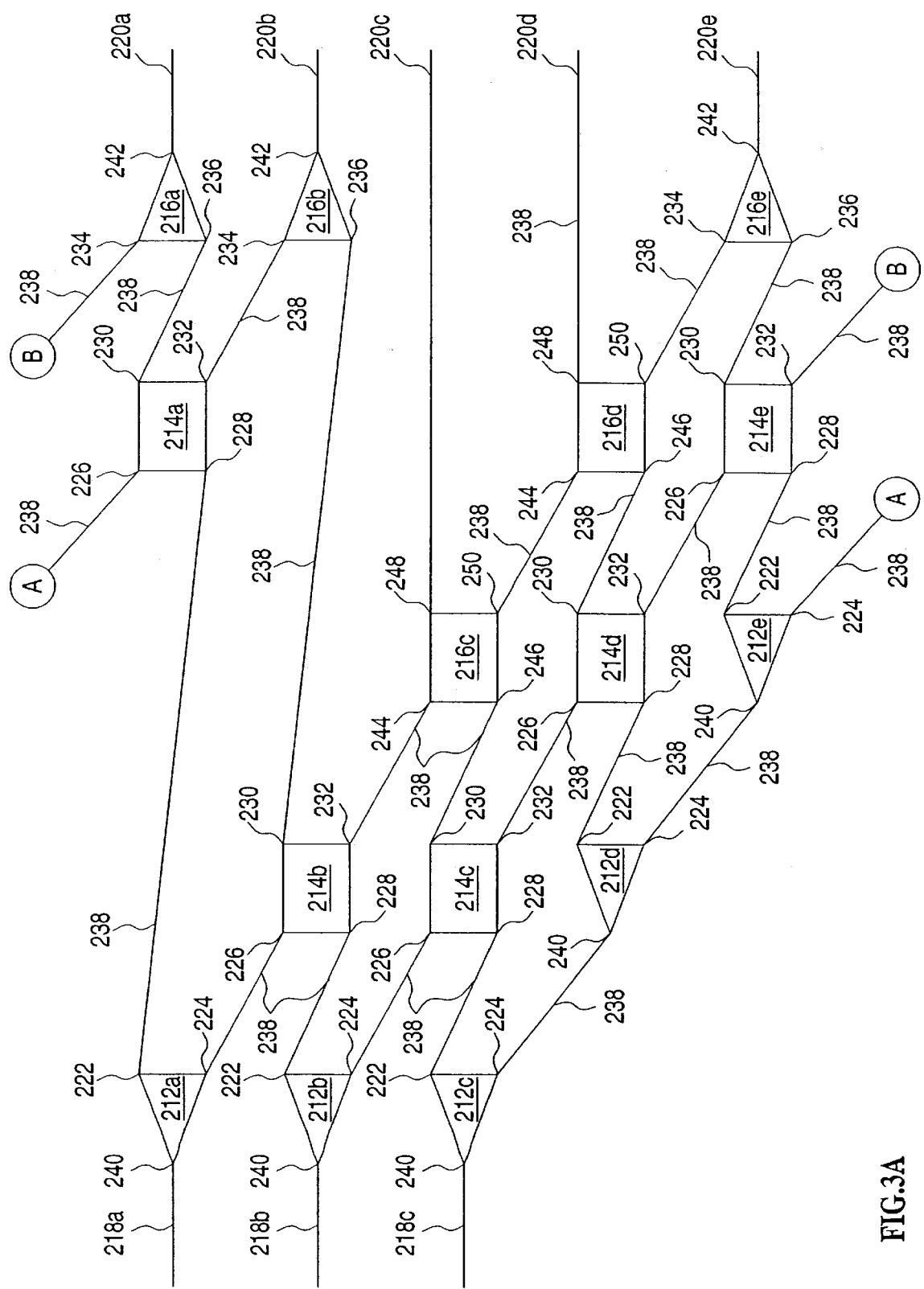
FIG. 3A illustrates an optical switch matrix of the present invention, for connecting three input waveguides to five output waveguides.

Referring again to the drawings, FIG. 3A shows a matrix 200 of the present invention for connecting three input waveguides 218 to five output waveguides 220 via five rows (a, b, c, d, e) of three switch sets 212, 214 and 216 each. Each 1×2 switch set 212 has a single input port 240 and two output ports, an upper output port 222 and a lower output port 224. Each intermediate switch set 214 has two input ports and two output ports: an upper input port 226, a lower input port 228, an upper output port 230 and a lower output port 232. Each 2×1 last switch set 216a, 216b and 216e has two input ports, an upper input port 234 and a lower input port 236, and a single output port 242. Each 2×2 last switch set 216c and 216d has two input ports and two output ports: an upper input port 244, a lower input port 246, an upper output port 248 and a lower output port 250. Each intermediate switch set 214 is in a X state, when OFF, that connects upper input port 226 to lower output port 232 and lower input port 228 to upper output port 230, and is in a=state, when ON, that connects upper input port 226 to upper output port 230 and lower input port 228 to lower output port 232. Similarly, each 2×2 last switch set 216c and 216d is in a X state, when OFF, that connects upper input port 244 to lower output port 250 and lower input port 246 to upper output port 248, and is in a=state, when ON, that connects upper input port 244 to upper output port 248 and lower input port 246 to lower output port 250. Input waveguides 218 are connected to corresponding input ports 240 of 1×2 switch sets 212a, 212b and 212c. Preferably, each 1×2 switch set 212 is a 2×2 switch, with an idle lower input port, that is in a X state, when OFF, that connects input port 240 to lower output port 224, and is in a=state, when ON, that connects input port 240 to upper output port 222. Likewise, it is preferable that each of last switch sets 216 of rows a, b and e be a 2×2 switch, with an idle lower output port, that is in a X state, when OFF, that connects lower input port 236 to output port 242, and that is in a=state, when ON, that connects upper input port 234 to output port 242. Output waveguides 220a, 220b and 220e are connected to corresponding output ports 242 of 2×1 last switch sets 216a, 216b and 216e. Output waveguides 220c and 220d are connected to corresponding upper output ports 248 of 2×2 last switch sets 216c and 216d. In each row, upper output ports 222 and 230 are connected by intermediate waveguides 238 to lower input ports 228, 236 or 246 of the immediately succeeding 1 5 switch sets 214 or 216; whereas lower output ports 224, 232 and 250 are connected by intermediate waveguides 238 to upper input ports 226, 234 or 244 of respective switch sets 214 or 216 in the cyclically succeeding row, or, in the case of lower output ports 224 of 1×2 switch sets 212c and 212d, to input ports 240 of respective switch sets 212 in the cyclically succeeding row. As in matrix 100, this connectivity to the cyclically 20 succeeding row wraps around to connect rows a and d, as represented in FIG. 3A by the circled terminations A and B on intermediate waveguides 238 that connect output ports 224 and 232 in row d to input ports 226 and 234 in row a.

The layout of matrix 200 is obtained from the layout of a 5×5 matrix similar to matrix 100, with five 1×2 switch sets 112a through 112e, fifteen 2×2 intermediate switch sets 114aa through 114ec and five 2×1 switch sets 116a through 116e, by deleting 1×2 switch sets 112d and 112e and all switch sets 114 and 116 that extend diagonally and cyclically downward from the deleted 1×2 switch sets, ie., intermediate switch sets 114ea, 114ab, 114bc, 114aa, 114bb and 114cc, and 2×1 switch sets 116c and 116d. Intermediate switch set 114ba becomes intermediate switch set 214b, intermediate switch set 114ca becomes intermediate switch set 214c, intermediate switch set 114da becomes 1×2 switch set 212d, intermediate switch set 114cb becomes 2×2 last switch set 216c, intermediate switch set 114db becomes intermediate switch set 214d, intermediate switch set 114eb becomes 1×2 switch set 212e, intermediate switch set 114a c becomes intermediate switch set 214a, intermediate switch set 114dc becomes 2×2 last switch set 216d, and intermediate switch set 114ec becomes intermediate switch set 214e.

Figure 3B:
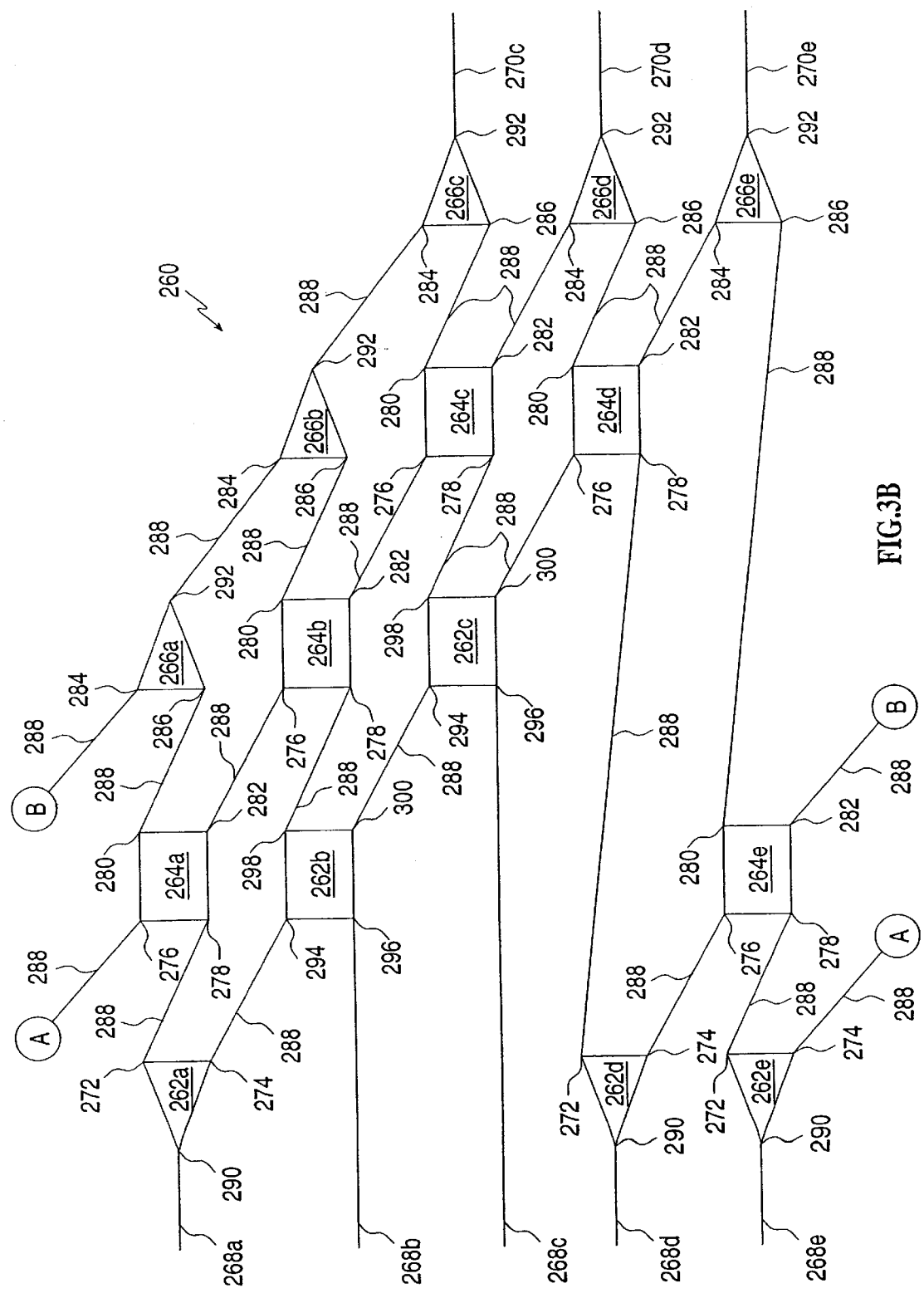
FIG. 3B illustrates an optical switch matrix of the present invention, for connecting five input waveguides to three output waveguides.

FIG. 3B shows a matrix 260 of the present invention for connecting five input waveguides 268 to three output waveguides 270 via five rows (a, b, c, d and e) of three switch sets 262, 264 and 266 each. The layout of matrix 260 is obtained from the layout of matrix 200 by rotating matrix 200 by 180 degrees in the plane of FIG. 3A and substituting input waveguides 268 for output waveguides 220, output waveguides 270 for input waveguides 218, first switch sets 262 for last switch sets 216, last switch sets 266 for first switch sets 212 and intermediate switch sets 264 for intermediate switch sets 214. Each 2x2 first switch set 262a, 262d and 262e has a single input port 290 and two output ports, an upper output port 272 and a lower output port 274. Each 2x2 first switch set 262b and 262c has two input ports and two output ports: an upper input port 294, a lower input port 296, an upper output port 298 and a lower output port 300. Each intermediate switch set 264 has two input ports and two output ports: an upper input port 276, a lower input port 278, an upper output port 280 and a lower output port 282. Each 2x1 switch set 266 has two input ports, an upper input port 284 and a lower input port 286, and a single output port 292. Each intermediate switch set 264 is in an X state, when OFF, that connects upper input port 276 to lower output port 282 and lower input port 278 to upper output port 280, and is in a=state, when ON, that connects upper input port 276 to upper output port 280 and lower input port 278 to lower output port 282. Similarly, each 2x2 first switch set 262b and 262c is in a X state, when OFF, that connects upper input port 294 to lower output port 300 and lower input port 296 to upper output port 298, and is in a=state, when ON, that connects upper input port 294 to upper output port 298 and lower input port 296 to lower output port 300. Input waveguides 268a, 268d and 268e are connected to corresponding input ports 290 of 1x2 first switch sets 262a, 262d and 262e. Input waveguides 268b and 268c are connected to corresponding lower input ports 296 of 2x2 first switch sets 262b and 262c. Output waveguides 270 are connected to corresponding output ports 292 of 2x1 switch sets 266c, 266d and 266e. Preferably, each x2 first switch set 262 of rows a, d and e is a 2x2 switch, with an idle upper input port, that is in a X state, when OFF, that connects input port 290 to upper output port 272, and that is in a=state, when ON, that connects input port 290 to lower output port 274. Likewise, it is preferable that each 2x1 switch set 266 be a 2x2 switch, with an idle upper output port, that is in an X state, when OFF, that connects upper input port 284 to output port 292, and that is an=state, when ON, that connects lower input port 286 to output port 292. In each row, upper output ports 272, 298 and 280 are connected by intermediate waveguides 288 to lower input ports 278 or 286 of the immediately succeeding switch sets 264 or 266; whereas lower output ports 274, 300 and 282 are connected by intermediate waveguides 288 to upper input ports 294, 276 and 284 of respective switch sets 262, 264 or 266 in the cyclically succeeding row; and output ports 292 of 2x1 switch sets 266a and 266b are connected by intermediate waveguides 288 to upper input ports 284 of respective 2x1 switch sets 266 in the cyclically succeeding rows. As in matrices 100 and 200, this connectivity to the cyclically succeeding row wraps around to connect rows a and d, as represented in FIG. 3B by the circled terminations A and B on intermediate waveguides 288 that connect output ports 274 and 282 in row d to input ports 276 and 284 in row a.

The architecture of matrices 100, 200 and 260 is wide-sense non-blocking, as defined by R. A. Spanke, "Architectures for guided-wave optical space switching systems", *IEEE Communications* Vol. 25 No. 5, pp. 42–48, May 1987. The worst case accumulated crosstalk in such a matrix that connects N input waveguides 218 to M output waveguides 220, due to signal leakage in intermediate switch sets 214 configured as single 2x2 switches, is $\Delta - 10 \log_{10}(N-1)$ dB, where $\Delta$ is the signal leakage in one 2x2 switch. For example, if $\Delta$ is 30 dB and N=16, then the accumulated crosstalk is 18 dB. Although this is a rather high crosstalk level it is suitable for applications in which additional filters, such as wavelength bandpass filters, are used. An advantage of this architecture is that it allows the use of relatively long switches and large numbers of input and output ports on a given substrate.

Figure 4:
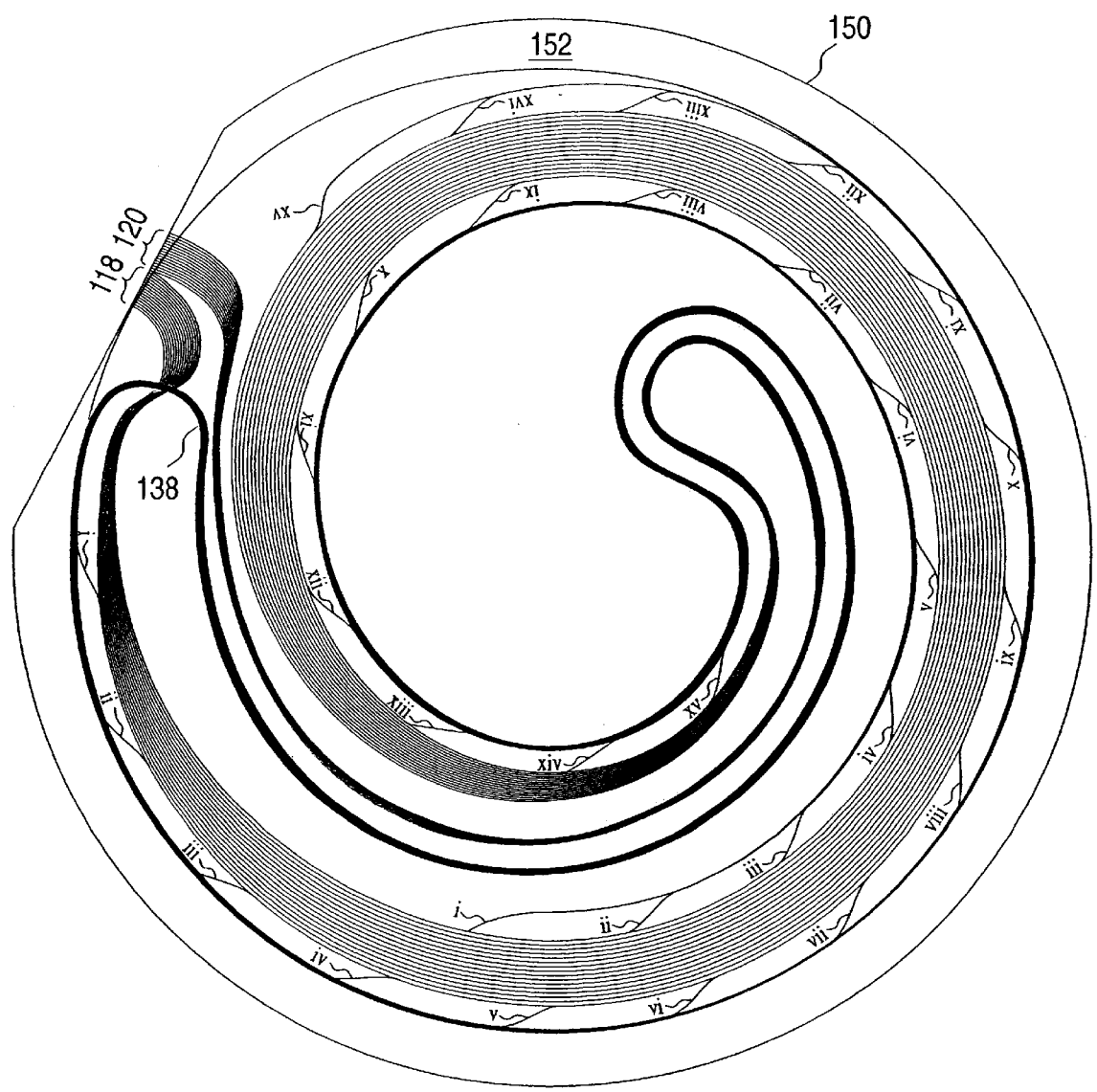
FIG. 4 shows the layout of a 16×16 optical switch matrix of the present invention, based on 2×2 switches as intermediate switch sets.

FIG. 4 shows a layout of a 16x16 matrix 100, based on 2x2 switches as intermediate switch sets 114, on a circular face 152 of a 4" cylindrical silicon wafer 150. In this layout, intermediate waveguides 138, that connect the first row of the matrix to the last row of the matrix, cross input waveguides 118. The 15 individual intermediate waveguides 138 that effect this cyclic connectivity from the last row to the first row are indicated by respective Roman numerals i through xv where these intermediate waveguides 138 depart from the last row and where these intermediate waveguides 138 enter the first row.

In some applications, it is important to have high extinction ratios between input waveguides 118, 218 or 268 and output ports 120, 220 or 270. In such a case, the crosstalk of embodiments of matrices 100, 200 and 260, that are based on single 2x2 switches as intermediate switch sets 114, 214 and 264, is too high. Therefore, intermediate switches sets based on two or more switching elements are used. Various embodiments of these intermediate switch sets include 1x2 active switches coupled to either 2x1 passive combiners or 2x1 active switches. Although the scope of the present invention includes both the embodiments of the intermediate switch sets that are based on 2x1 passive combiners and the embodiments of the intermediate switch sets that are based on active 2x1 switches, it is the embodiments with the active 2x1 switches that are most preferred because it is the embodiments with the active 2x1 switches that achieve the required high extinction ratios.

Figure 5:
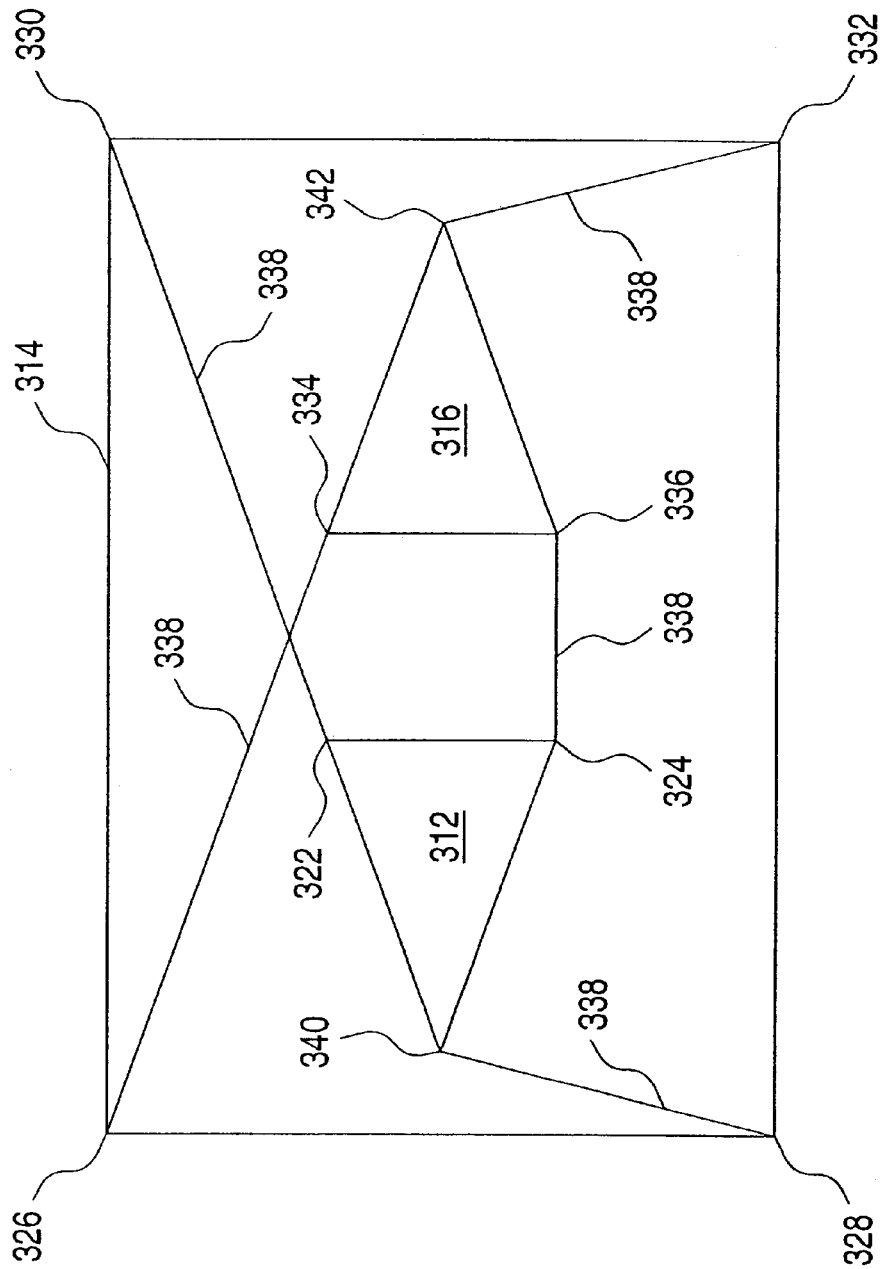
FIG. 5 illustrates an intermediate switch set based on an active 1×2 switch and a 2×1 combiner.

One such intermediate switch set 314 is illustrated in FIG. 5. Intermediate switch set 314 is based on a 1x2 active switch 312 and a 2x1 combiner 316. 1x2 switch 312 has an input port 340, an upper output port 322 and a lower output port 324. 2x1 combiner 316 has an upper input port 334, a lower input port 336 and an output port 342. Switch set 314 itself has an upper input port 326, a lower input port 328, an upper output port 330 and a lower output port 332. Internal waveguides 338 connect upper input port 334 of 2x1 combiner 316 to upper input port 326 of switch set 314, input port 340 of 1x2 switch 312 to lower input port 328 of switch set 314, upper output port 322 of 1x2 switch 312 to upper output port 330 of switch set 314, and output port 342 of 2x1 combiner 316 to lower output port 332 of switch set 314. Another internal waveguide 338 connects lower output port 324 of 1x2 switch 312 to lower input port 336 of 2x1 combiner 316. Although an additional crossing of waveguides is introduced by having internal waveguide 338, that connects upper input port 334 of 2x1 combiner 316 to upper input port 326 of switch set 314, cross internal waveguide 338, that connects upper output port 322 of 1x2 switch 312 to upper output port 330 of switch set 314, these internal waveguides 338 can be configured to cross at a relatively large angle, thereby minimizing the associated loss. 1x2 active switch 312 is a 2x2 switch, with an idle lower input port, that is configured to be in its=state when OFF, passing optical energy from input port 340 to upper output port 322, and in its X state when ON, passing optical energy from input port 340 to lower output port 324. Therefore, switch set 314 passes optical energy from lower input port 328 to upper output port 330 when OFF and from lower input port 328 to lower output port 332 when ON. If 2x1 combiner 316 is passive, then switch set 314 always passes optical energy from upper input port 326 to lower output port 332. As described above, to connect one of input waveguides 118, of a matrix 100 that uses switch sets 314 as intermediate switch sets 114, and that uses switch sets 112 and 116 that are ON in their=states and OFF in their X states, to one of output waveguides 120 thereof, it suffices to turn ON only one switch set 112, 114 or 116.

If 2×1 combiner 316 is active, then 2×1 combiner 316 is a 2×2 switch, with an idle lower output port, that is configured to be in its=state, passing optical energy from upper input port 334 to output port 342 when OFF, and in its X state, passing optical energy from lower input port 336 to output port 342, when ON. In that case, with both 1×2 switch 312 and 2×1 switch 316 OFF, switch set 314 is in a X state in which optical energy entering upper input port 326 leaves via lower output port 332 and in which optical energy entering lower input port 328 leaves via upper output port 330. With both 1×2 switch 312 and 2×1 switch 316 ON, switch set 314 is in a modified=state in which optical energy entering upper input port 326 is lost at the idle lower output port of 2×1 switch 316 and optical energy entering lower input port 328 leaves via lower output port 332. If switch set 314 is considered to be ON when switches 312 and 316 both are ON and if switch set 314 is considered to be OFF when switches 312 and 316 both are OFF, then, again, to connect one of input waveguides 118, of a matrix 100 that uses switch sets 314 as intermediate switch sets 114, and that uses switch sets 112 and 116 that are ON in their=states and OFF in their X states, to one of output waveguides 120 thereof, it suffices to turn ON only one switch set 112, 114 or 116.

Figure 6:
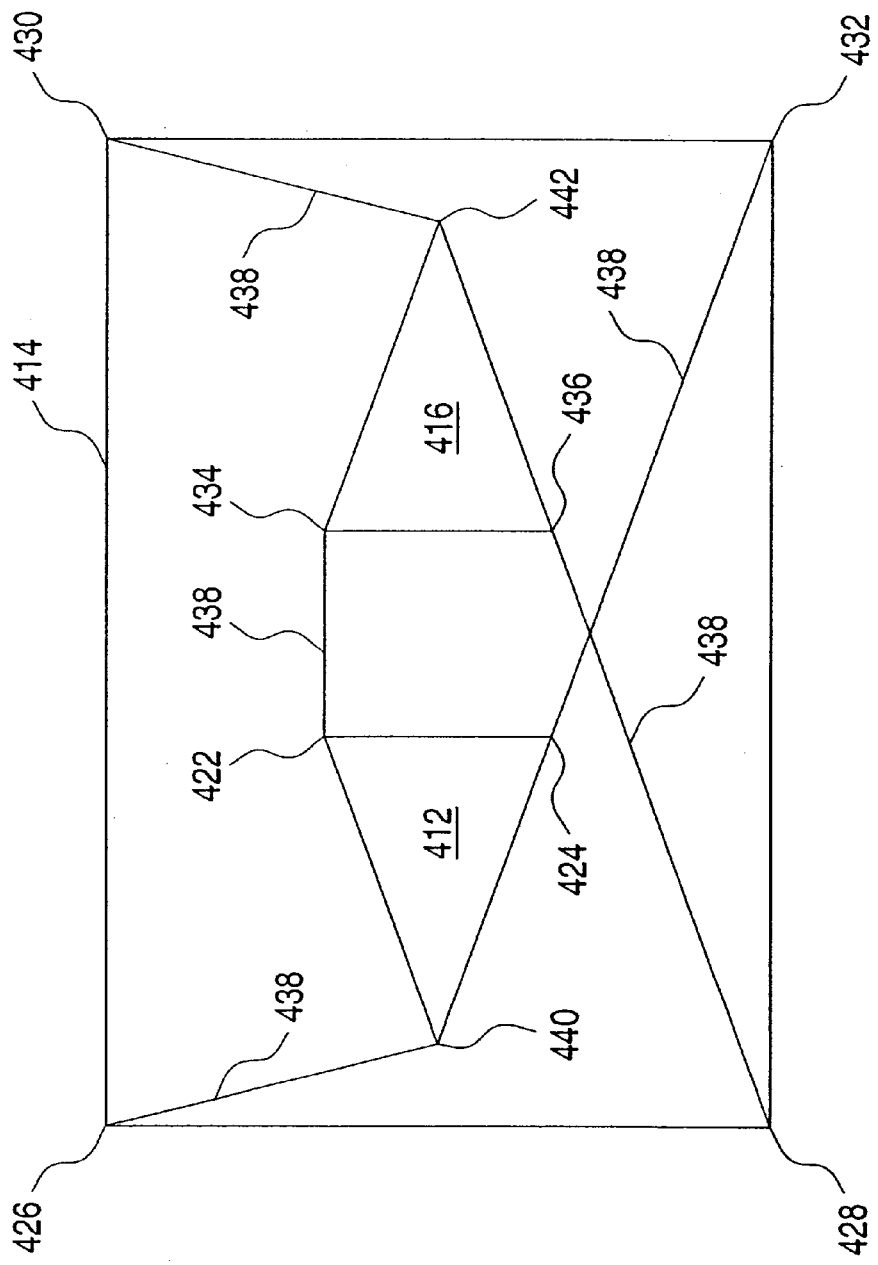
FIG. 6 illustrates another intermediate switch set based on an active 1×2 switch and a 2×1 combiner.

FIG. 6 shows another intermediate switch set 414 that is based on a 1×2 active switch 412 and a 2×1 combiner 416. 1×2 switch 412 has an input port 440, an upper output port 422 and a lower output port 424. 2×1 combiner 416 has an upper input port 434, a lower input port 436 and an output port 442. Switch set 414 itself has an upper input port 426, a lower input port 428, an upper output port 430 and a lower output port 432. Internal waveguides 438 connect lower input port 436 of 2×1 combiner 416 to lower input port 428 of switch set 414, input port 440 of 1×2 switch 412 to upper input port 426 of switch set 414, lower output port 424 of 1×2 switch 412 to lower output port 432 of switch set 414, and output port 442 of 2×1 combiner 416 to upper output port 432 of switch set 414. Another internal waveguide 438 connects upper output port 422 of 1×2 switch 412 to upper input port 434 of 2×1 combiner 416.

1×2 switch 412 is a 2×2 switch, with an idle lower input port, that is configured to be ON in its=state, passing optical energy from input port 440 to upper output port 422, and OFF in its X state, passing optical energy from input port 440 to lower output port 424. Therefore, switch set 414 passes optical energy from upper input port 426 to lower output port 432 when OFF and from upper input port 426 to upper output port 430 when ON. If 2×1 combiner 416 is passive, then switch set 414 always passes optical energy from lower input port 428 to upper output port 430. As described above, to connect one of input waveguides 118, of a matrix 100 that uses switch sets 414 as intermediate switch sets 114 and that uses switch sets 112 that are OFF in their X states and ON in their=states, to one of output waveguides 120 thereof, it suffices to turn ON only one switch set 112, 114 or 116.

If 2×1 combiner 416 is active, then 2×1 combiner 416 is a 2×2 switch with an idle lower output port, configured to be in its=state, passing optical energy from upper input port 434 to output port 442 when ON, and in its X state, passing optical energy from lower input port 436 to output port 442, when OFF. In that case, with both 1×2 switch 412 and 2×1 switch 416 OFF, switch set 414 is in a X state in which optical energy entering upper input port 426 leaves via lower output port 432 and in which optical energy entering lower input port 428 leaves via upper output port 430. With both 1×2 switch 412 and 2×1 switch 416 ON, switch set 414 is in a modified=state in which optical energy entering lower input port 428 is lost at the idle lower output port of 2×1 switch 416 and optical energy entering upper input port 426 leaves via upper output port 430. If switch set 414 is considered to be ON when switches 412 and 416 both are ON and if switch set 414 is considered to be OFF when switches 412 and 416 both are OFF, then, again, to connect one of input waveguides 118, of a matrix 100 that uses switch sets 414 as intermediate switch sets 114, and that uses switch sets 112 and 116 that are OFF in their X states and ON in their=states, to one of output waveguides 120 thereof, it suffices to turn ON only one switch set 112, 114 or 116.

In the operational configuration of matrix 100 described above, turning ON any one switch set 112, 114 or 116 connects input waveguide 118, that feeds into the diagonal of matrix 100 on which that switch set 112, 114 or 116 lies, to output waveguide 120, that emerges from the row of matrix 100 on which that switch set 112, 114 or 116 lies. Matrix 100 also can be configured in a reciprocal operational configuration, in which turning ON any one switch set 112, 114 or 116 connects input waveguide 118, that feeds into the row of matrix 100 on which that switch set 112, 114 or 116 lies, to output waveguide 120, that emerges from the diagonal of matrix 100 on which that switch set 112, 114 or 116 lies. This is accomplished, for example, by using, as switch sets 112, 2×2 switches with idle lower ports that are configured to be OFF in their=states, passing optical energy from input ports 140 to output ports 122, and ON in their X states, passing optical energy from input ports 140 to output ports 124; and by using, as switch sets 116, 2×2 switches with idle lower ports that are configured to be OFF in their=states, passing optical energy from input ports 134 to output ports 142, and ON in their X states, passing optical energy from input ports 136 to output ports 142. Switch sets 114 are configured as before, to be ON in their=states, passing optical energy from input ports 126 to output ports 130 and from input ports 128 to output ports 132, and OFF in their X states, passing optical energy from input ports 126 to output ports 132 and from input ports 128 to output ports 130.

Figure 7:
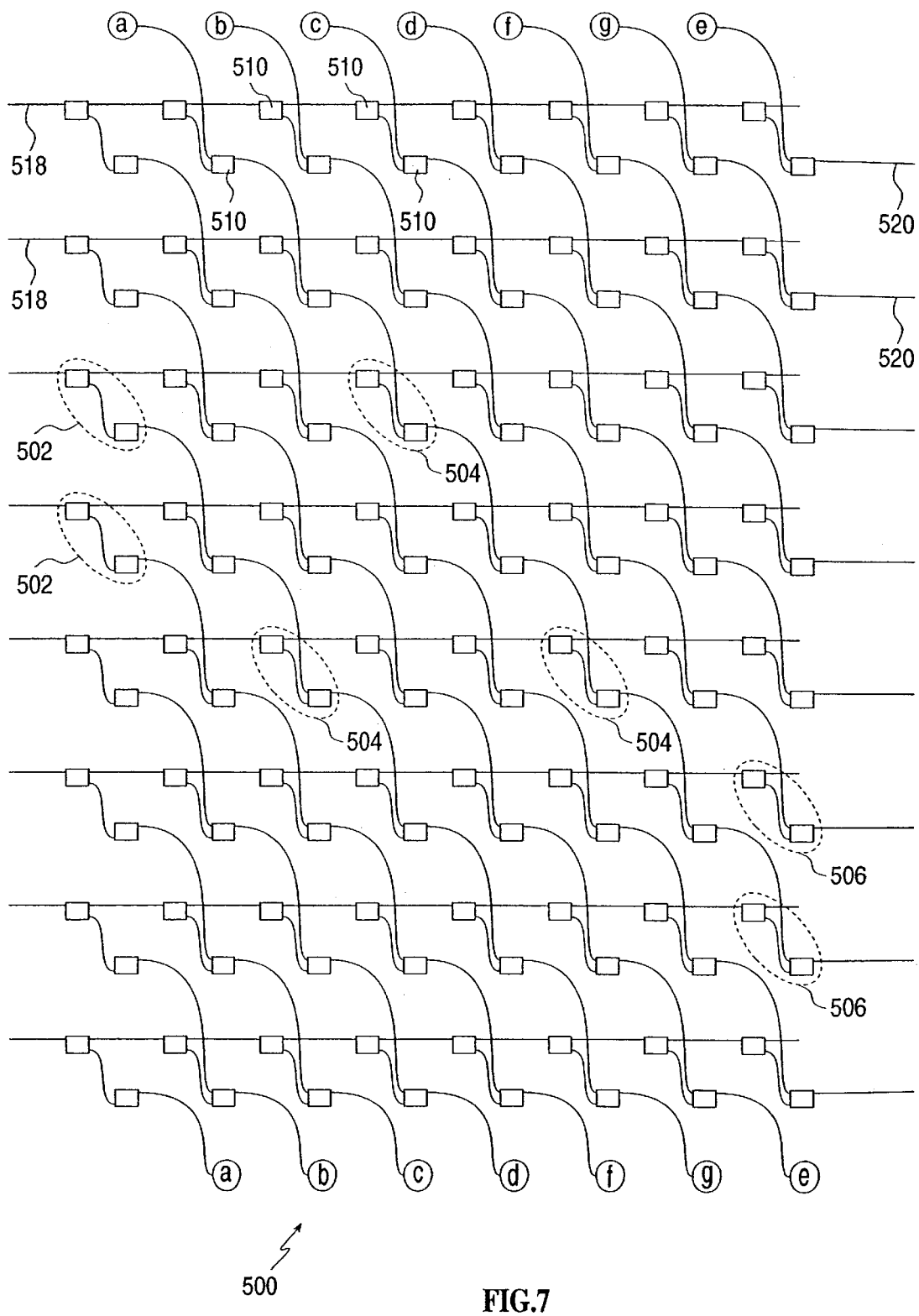
FIG. 7 shows a matrix of pairs of 2×2 switches that is topologically equivalent to an 8×8 optical switch matrix of the present invention based on the switch set of FIG. 8 as input switch sets, the switch set of FIG. 5 with an active 2×1 combiner as intermediate switch sets, and the switch set of FIG. 9 as output switch sets.
Figure 8:
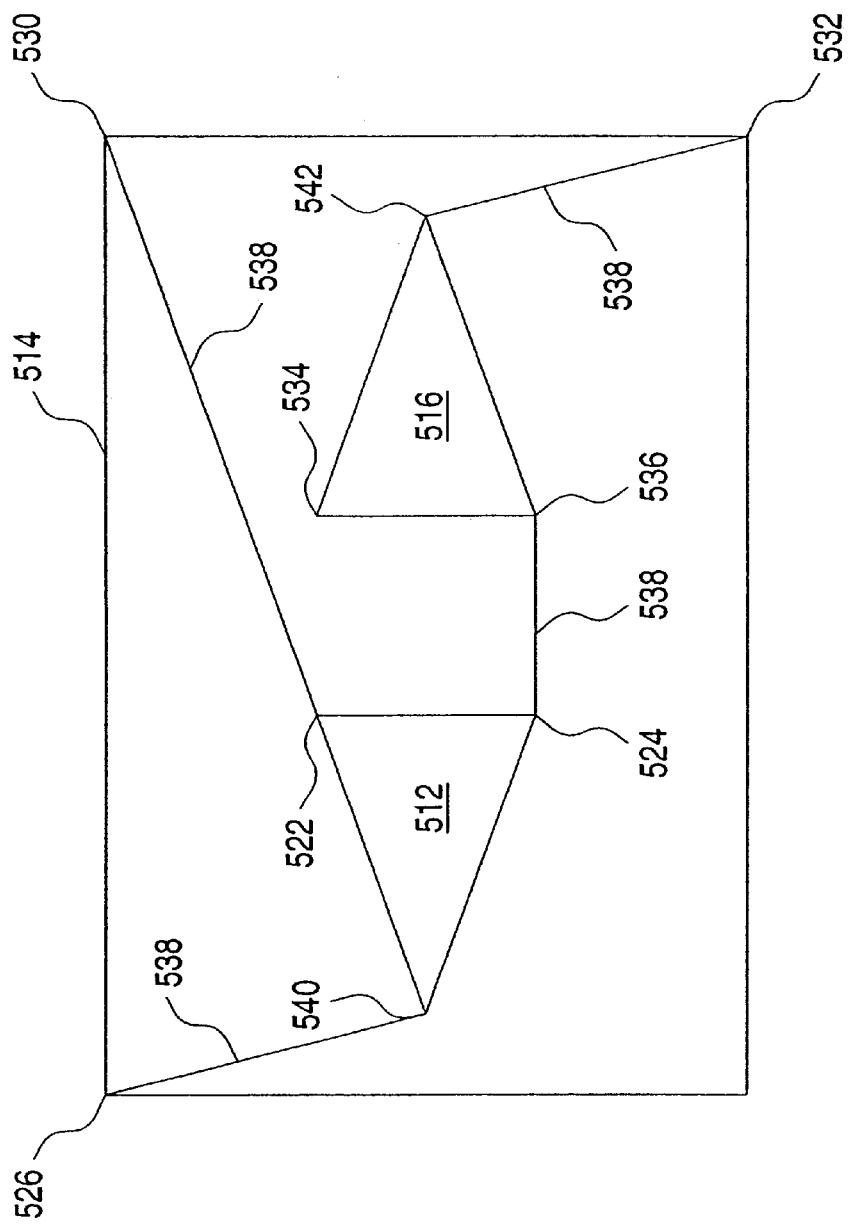
FIG. 8 illustrates an input switch set based on an active 1×2 switch and an active 2×1 switch.
Figure 9:
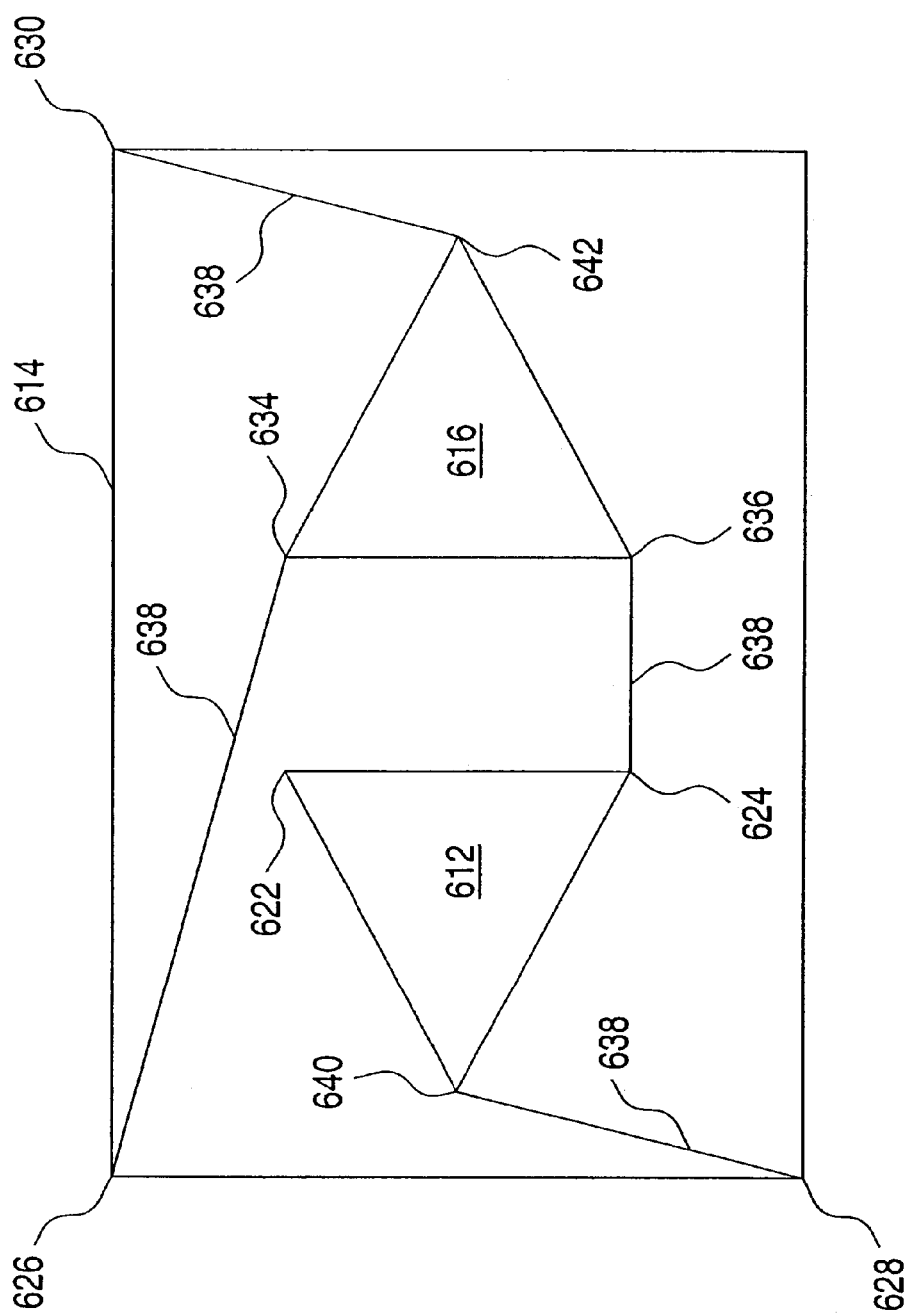
FIG. 9 illustrates an output switch set based on an active 1×2 switch and an active 2×1 switch.

FIG. 7 shows a matrix 500 of pairs 502, 504 and 506 of 2×2 switches 510, for connecting eight input waveguides 518 to eight output waveguides 520 according to the second operational configuration. Matrix 500 is topologically equivalent to an 8×8 version of matrix 100 that uses intermediate switch sets 314, with active 2×1 combiners 316, as described above, input switch sets 514 of FIG. 8 in place of 1×2 switches 112, and output switch sets 614 of FIG. 9 in place of 2×1 switches 116. Input pairs 502 are topologically equivalent to switch sets 514. Intermediate pairs 504 are topologically equivalent to switch sets 314. Output pairs 506 are topologically equivalent to switch sets 614.

Input switch set 514 is based on a 1×2 switch 512 and a 2×1 switch 516. 1×2 switch 512 has an input port 540, an upper output port 522 and a lower output port 524. 2×1 switch 516 has an idle upper input port 534, a lower input port 536 and an output port 542. Switch set 514 itself has an input port 526, an upper output port 530 and a lower output port 532. Internal waveguides 538 connect input port 540 of 1×2 switch 512 to input port 526 of switch set 514, upper output port 522 of 1×2 switch 512 to upper output port 530 of switch set 514, and output port 542 of 2×1 switch 516 to lower output port 532 of switch set 514. Another internal waveguide 538 connects lower output port 524 of 1×2 switch 512 to lower input port 536 of 2×1 switch 516. 1×2 switch 512 is a 2×2 switch, with an idle lower input port, that is configured to be in its=state, passing optical energy from input port 540 to upper output port 522, when OFF, and in its X state, passing optical energy from input port 540 to lower output port 524, when ON. 2×1 switch 516 is a 2×2 switch, with an idle lower output port, configured to be in its=state, which would pass optical energy from upper input port 534 to output port 542 if upper input port 534 were not idle, when OFF, and in its X state, passing optical energy from lower input port 536 to output port 542, when ON. Switch set 514 is considered OFF when both 1×2 switch 512 and 2×1 switch 516 are OFF, so that optical energy entering switch set 514 via input port 526 leaves switch set 514 via upper output port 530. Switch set 514 is considered ON when both 1×2 switch 512 and 2×1 switch 516 are ON, so that optical energy entering switch set 514 via input port 526 leaves switch set 514 via lower output port 532.

Output switch set 614 is based on a 1×2 switch 612 and a 2×1 switch 616. 1×2 switch 612 has an input port 640, an idle upper output port 622 and a lower output port 624. 2×1 switch 616 has an upper input port 634, a lower input port 636 and an output port 642. Switch set 614 itself has an upper input port 26, a lower input port 628 and an output port 630. Internal waveguides 638 connect input port 640 of 1×2 switch 612 to lower input port 628 of switch set 614, upper input port 634 of 2×1 switch 616 to upper input port 626 of switch set 614, and output port 642 of 2×1 switch 616 to output port 630 of switch set 614. Another internal waveguide 638 connects lower output port 624 of 1×2 switch 612 to lower input port 636 of 2×1 switch 616.

1×2 switch 612 is a 2×2 switch, with an idle lower input port, that is configured to be in its=state, which would pass optical energy from input port 640 to upper output port 622 if upper input port 622 were not idle, when OFF, and in its X state, passing optical energy from input port 640 to lower output port 624, when ON. 2×1 switch 616 is a 2×2 switch, with an idle lower output port, that is configured to be in its=state, passing optical energy from upper input port 634 to output port 642, when OFF, and in its X state, passing optical energy from lower input port 636 to output port 642, when ON. Switch set 614 is considered OFF when both 1×2 switch 612 and 2×1 switch 616 are OFF, so that optical energy entering switch set 614 via upper input port 626 leaves switch set 614 via output port 630 and optical energy entering switch set 614 via lower input port 628 is lost at idle upper output port 622 of 1×2 switch 612. Switch set 614 is considered ON when both 1×2 switch 612 and 2×1 switch 616 are ON, so that optical energy entering switch set 614 via upper input port 626 is lost at the idle lower output port of 2×1 switch 616 and optical energy entering switch set 614 via lower input port 628 leaves switch set 614 via output port 630.

In an embodiment of matrix 100 or 200 in which switch sets 314 having active 2×1 switches 316 are used as intermediate switch sets 114 or 214, in which switch sets 514 are used as input switch sets 112 or 212, and in which switch sets 614 are used as output switch sets 116 or 216, any noise added to the signal must traverse two closed switches. Therefore, the worst case accumulated crosstalk, in such a matrix that connects N input waveguides to M output waveguides, is $2\Delta - 10 \log_{10}(N-1)$ dB, where $\Delta$ is the signal leakage in one of switches 312 or 316. For example, if $\Delta$ is 30 dB and N=16, then the accumulated crosstalk is 48 dB. This architecture also has the advantage of the OFF state of the switches being asymmetric and so relatively insensitive to production tolerances.

Figure 10:
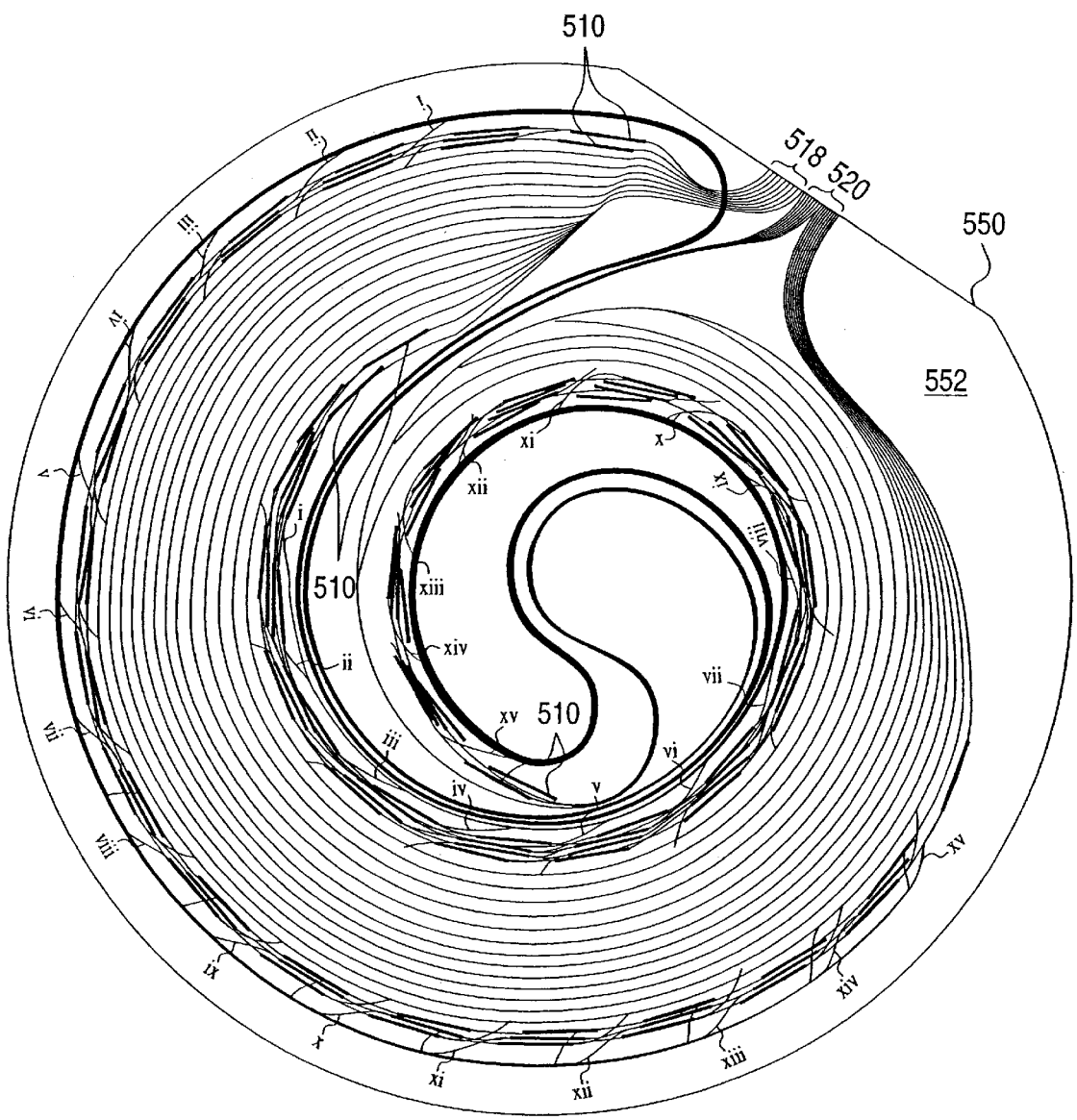
FIG. 10 shows the layout of a 16×16 optical switch matrix of the present invention, based on the switch set of FIG. 8 as input switch sets, on the switch set of FIG. 5 as intermediate switch sets, and on the switch set of FIG. 9 as output switch sets

FIG. 10 shows a layout of a 16×16 matrix 500, on a circular face 552 of a 4" cylindrical silicon wafer 550. As in the layout of FIG. 4, intermediate waveguides 548, that connect the first row of the matrix to the last row of the matrix, cross input waveguides 518; and the 15 individual intermediate waveguides 548 that effect this cyclic connectivity from the last row to the first row are indicated by respective Roman numerals i through xv where these intermediate waveguides 548 depart from the last row and where these intermediate waveguides 548 enter the first row. For illustrational clarity, only some of 2×2 switches 510 are shown in FIG. 10.

Figure 11:
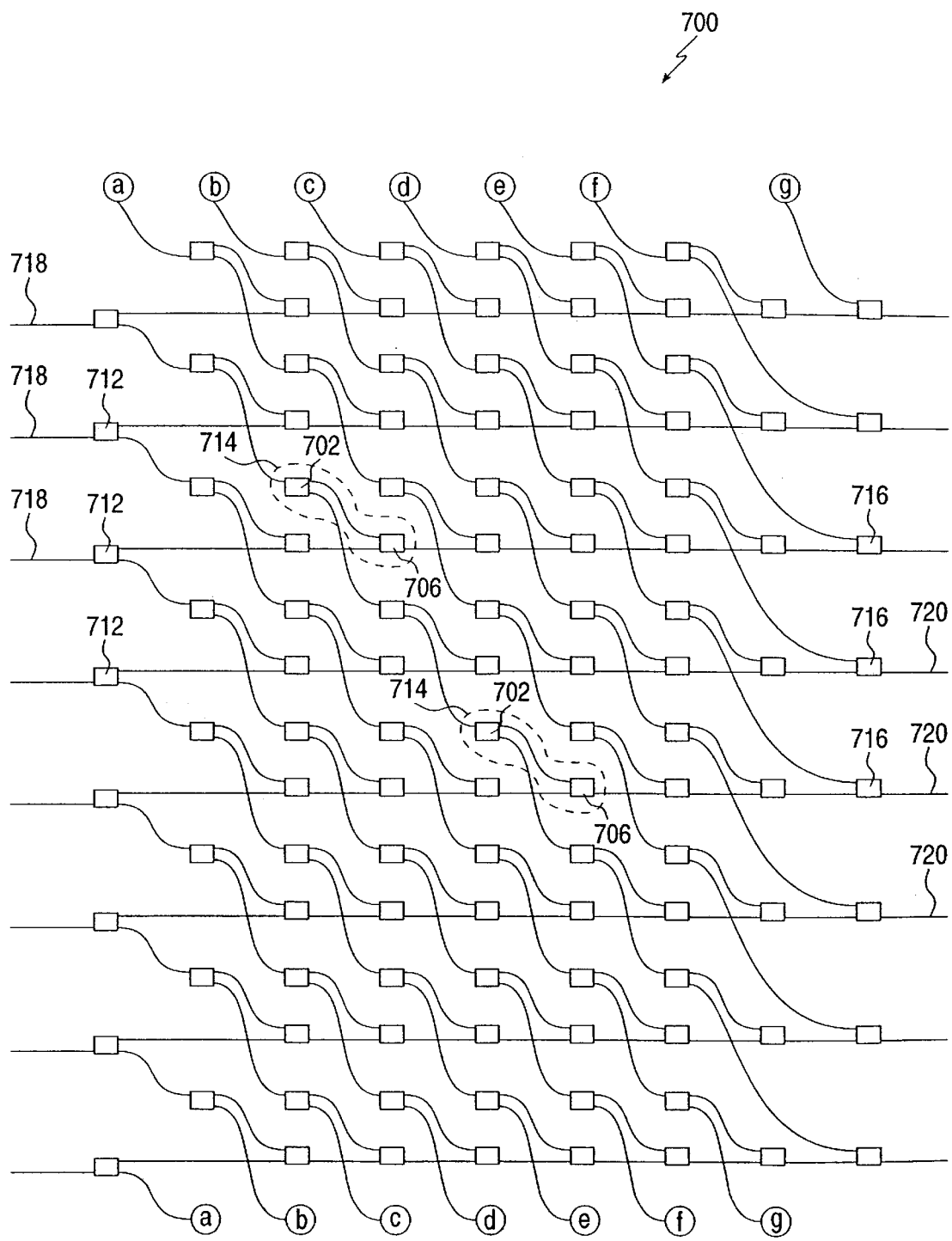
FIG. 11 shows a second 8×8 optical switch matrix of the present invention, based on first and last switch sets that are single 2×2 switches and on intermediate switch sets that are pairs of 2×2 switches.

FIG. 11 shows a matrix 700 of switch sets 712, 714 and 716 for connecting eight input waveguides 718 to eight output waveguides 720. First switch sets 712 are 2×2 switches whose upper input ports are idle and that are configured to be in their=states when OFF and in their X states when ON. Similarly, last switch sets 716 are 2×2 switches whose upper output ports are idle and that are configured to be in their=states when OFF and in their X states when ON. Each intermediate switch set 714 includes two 2×2 switches 702 and 706, connected according to the topology of switch set 414 of FIG. 6. Intermediate switch set 714 is the embodiment of switch set 414 with a 2×1 switch 416, with the following modifications: 1×2 switch 412 now is a 2×2 switch 702 whose upper input port is idle, 2×1 switch 416 now is a 2×2 switch 706 whose upper output port is idle, and switches 702 and 706 are in their=states when OFF and in their X states when ON. Topologically, matrix 700 is equivalent to an 8×8 version of matrix 100. Matrix 700 operates according to the first operational configuration of matrix 100: optical energy entering matrix 700 from any input waveguide 718 travels along a diagonal of matrix 700 until diverted to a row of matrix 700 by an ON switch set 712, 714 or 716. As before, to route optical energy from any one input waveguide 718 to any one output waveguide 720, it suffices to turn ON only one switch set 712, 714 or 716, while leaving all the other switch sets off.

Figure 12:
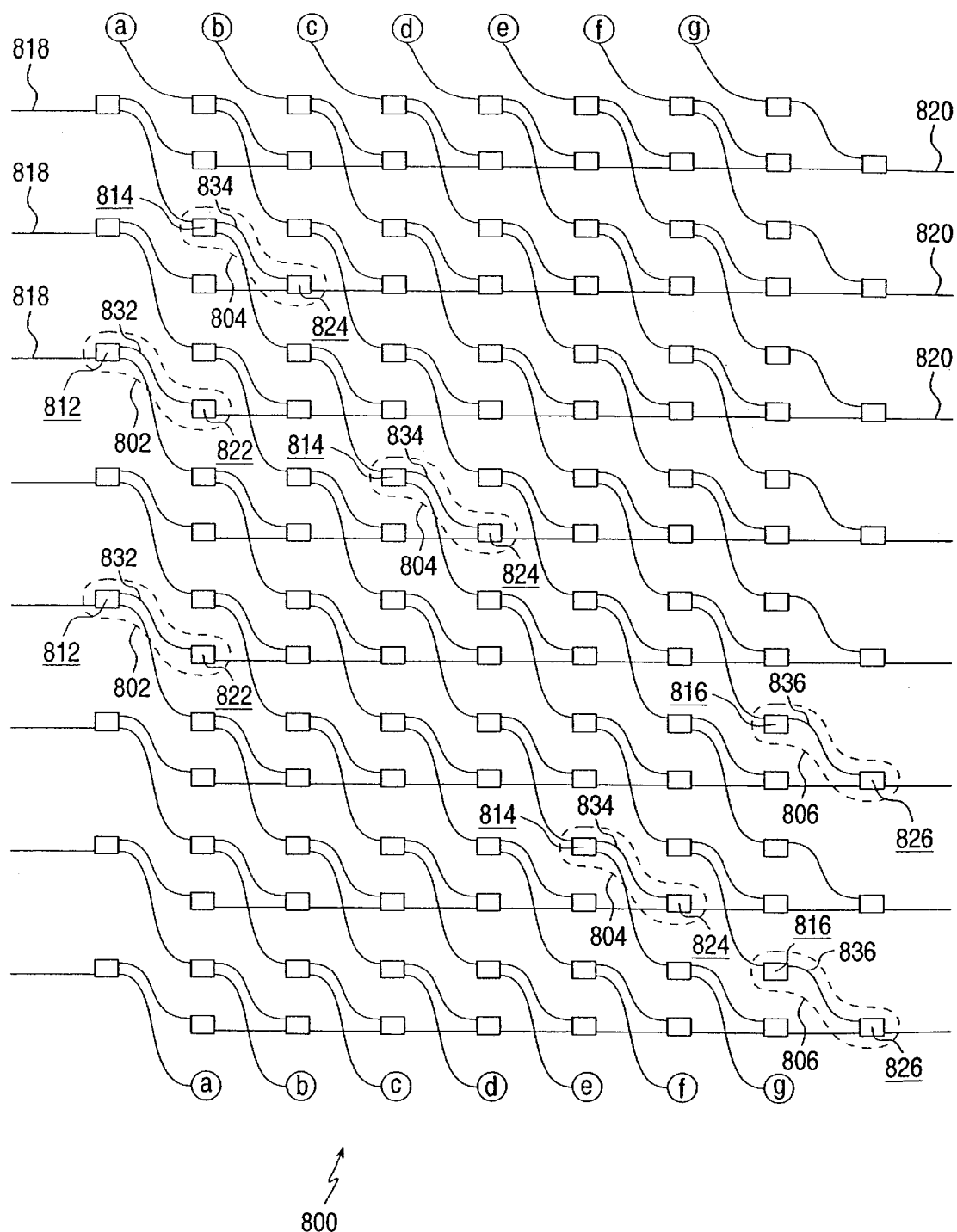
FIG. 12 shows a third 8×8 optical switch matrix of the present invention, based on switch sets that are pairs of 2×2 switches.

FIG. 12 shows a matrix 800 of switch sets 802, 804 and 806 for connecting eight input waveguides 818 to eight output waveguides 820. Each first switch set 802 includes two 2×2 switches, a 2×2 switch 812 with an idle upper input port and a 2×2 switch 822 with both an idle lower input port and an idle upper output port. Each intermediate switch set 804 includes two 2×2 switches, a 2×2 switch 814 with an idle upper input port and a 2×2 switch 824 with an idle upper output port. Each last switch set 806 includes two 2×2 switches, a 2×2 switch 816 with an idle upper input port and a 2×2 switch 826 with an idle upper output port. The topology of matrix 800 is similar to the topology of matrix 700, so that, like matrix 700, matrix 800 is topologically equivalent to an 8×8 version of matrix 100. The principle difference between matrix 700 and matrix 800 is that in matrix 700, each first switch set 712 and each last switch set 716 includes a single 2×2 switch, whereas in matrix 800, each first switch set 802 and each last switch set 806 includes two 2×2 switches. The lower input port of switch 812 serves as the input port of switch set 802. The lower output port of switch 812 serves as the lower output port of switch set 502. The lower output port of switch 822 serves as the upper output port of switch set 502. The upper output port of switch 812 is optically coupled to the upper input port of switch 822 by an internal waveguide 832. The lower input port of switch 816 serves as the upper input port of switch set 806. The lower input port of switch 826 serves as the lower input port of switch set 806. The lower output port of switch 826 serves as the output port of switch set 806. The upper output port of switch 816 is optically coupled to the upper input port of switch 826 by an internal waveguide 836.

The lower input port of switch 814 serves as the upper input port of switch set 804. The lower input port of switch 824 serves as the lower input port of switch set 804. The lower output port of switch 814 serves as the lower output port of switch set 804. The lower output port of switch 824 serves as the upper output port of switch set 804. The upper output port of switch 814 is optically coupled to the upper input port of switch 824 by an internal waveguide 834.

All switches 812, 822, 814, 824, 816 and 826 are configured to be in their states when OFF and in their x states when ON. A first switch set 802 is considered OFF when both switches 812 and 822 thereof are OFF, and ON when both switches 812 and 822 thereof are ON. An intermediate switch set 804 is considered OFF when both switches 814 and 824 thereof are OFF, and on when both switches 814 and 824 thereof are ON. A final switch set 806 is considered OFF when both switches 816 and 826 thereof are OFF, and ON when both switches 816 and 826 thereof are ON. Optical energy entering matrix 800 via any input waveguide 818 travels along a diagonal of matrix 800 until diverted by an ON switch set 802, 804 or 806 to a row of matrix 100. To route optical energy from any one input waveguide 818 to any one output waveguide 820, it suffices to turn ON only one switch set 802, 804 or 806, while leaving all the other switch sets OFF.

Figure 13:
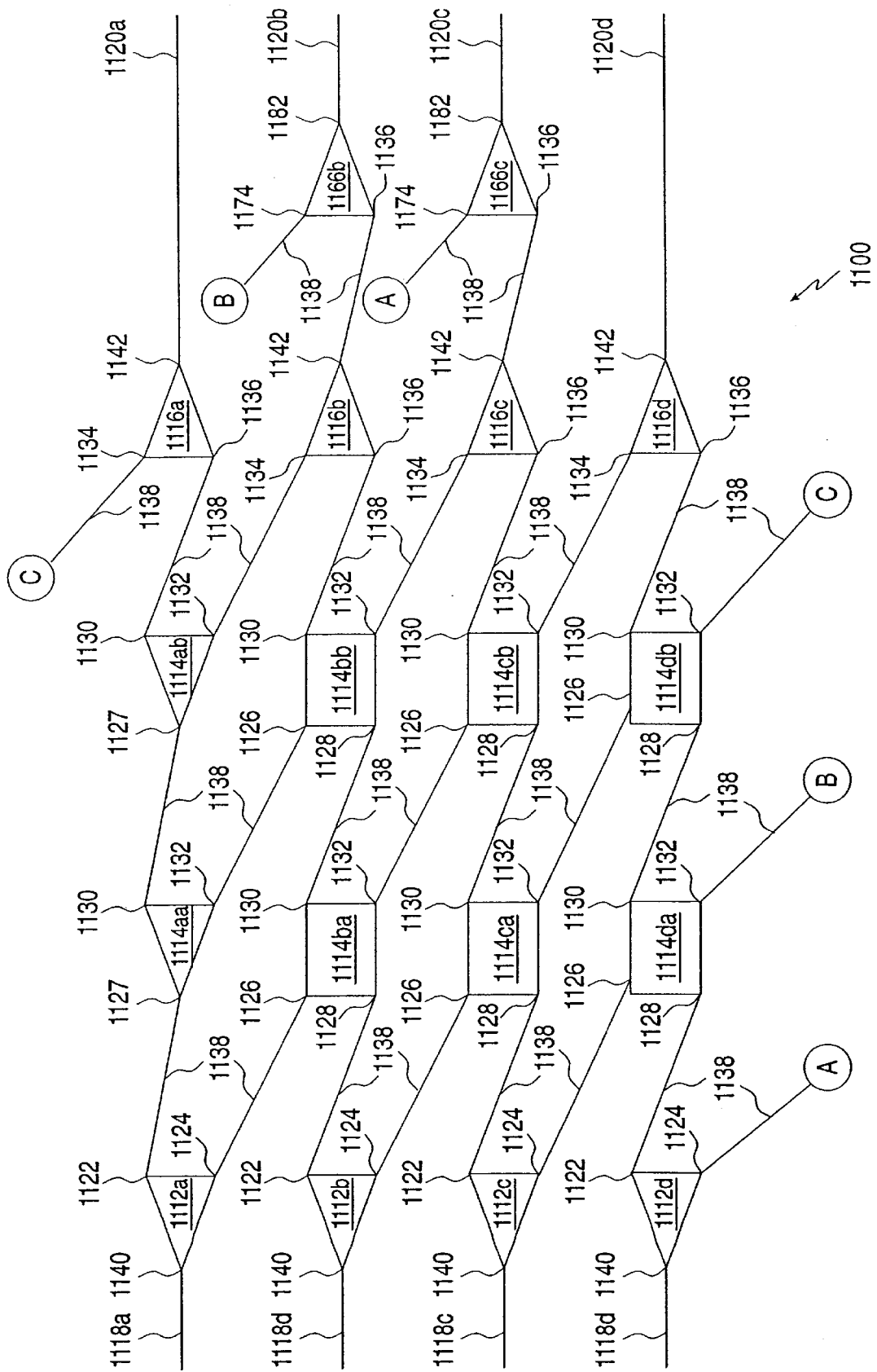
FIG. 13 illustrates an optical switch matrix, for connecting four input waveguides to four output waveguides, according to a second aspect of the present invention.

FIG. 13 illustrates an alternative optical switch matrix 1100 of the present invention. Like matrix 100, matrix 1100 connects four input waveguides 1118 to four output waveguides 1120 via four rows (a, b, c, d) of switch sets 1112, 1114, 1116 and 1166. Like switch sets 112, the first (input) switch set 1112 of each row is an active 1×2 switch. In row a, intermediate switch sets 1114 also are active 1×2 switches. In the other rows, intermediate switch sets 1114 are, like switch sets 114, either single 2×2 switches or combinations of two or more switches, as described above in the context of matrices 100, 200 and 500. Intermediate switch sets 1114 are followed in each row by an active 2×1 switch 1116. In two of the four rows, specifically, in rows b and c, active 2×1 switch 1116 is in turn followed by another active 2×1 switch 1166. Because switch sets 1116 may or may not be followed by more switch sets in their respective rows, switch sets 1116 are referred to herein as "penultimate" switch sets, whereas only switch sets 1166 are referred to as "last" switch sets.

Each 1×2 switch 1112 has a single input port 1140 and two output ports, an upper output port 1122 and a lower output port 1124. Each intermediate switch set 1114 of row a has a single input port 1127; each intermediate switch set 1114 of rows b, c and d has two input ports: an upper input port 1126 and a lower input port 1128. Each intermediate switch set 1114 has two output ports: an upper output port 1130 and a lower output port 1132. Each 2×1 switch 1116 has two input ports, an upper input port 1134 and a lower input port 1136, and a single output port 1142. Each 2×1 switch 1166 has two input ports, an upper input port 1174 and a lower input port 1176, and a single output port 1182. Input waveguides 1118 are connected to corresponding output ports 1140. Output waveguides 1120 are connected to corresponding output ports of the rightmost switch sets in their respective rows: output ports 1142 in rows a and d and output ports 1182 in rows b and c. In row a, upper output ports 1122 and 1130 are connected by intermediate waveguides 1138 to input ports of the immediately succeeding switch sets: either input ports 1127 or lower input port 1136 of switch set 1116*a*. In the other rows, upper output ports 1122 and 1130 are connected by intermediate waveguides 1138 to lower input ports 1128 and 1136 of the immediately succeeding switch sets 1114 or 1116. In the first three rows, lower output ports 1124 and 1132 are connected by intermediate waveguides 1138 to upper input ports 1126 or 1134 of respective switch sets 1114 or 1116 of the succeeding rows. In row d, only lower output port 1132 of intermediate switch set 1114*db* is connected by an intermediate waveguide 1138 to an upper input port (1134) of cyclically succeeding row a. The other two lower output ports are connected by intermediate waveguides 1138 to respective upper input ports 1174 of last switch sets 1166 of rows b and c. Lower input ports 1176 of last switch sets 1166 are connected by intermediate waveguides 1138 to output ports 1142 of penultimate switch sets 1116 of their respective rows.

Let switch sets 1112 be 2×2 switches, with idle upper input ports, that are configured to be ON in their=states, passing optical energy from input ports 1140 to output ports 1124, and OFF in their X states, passing optical energy from input ports 1140 to output ports 1122. Let switch sets 1114*aa* and 1114*ab* be 2×2 switches, with idle upper input ports, that are configured to be ON in their=states, passing optical energy from input ports 1127 to output ports 1132, and OFF in their X states, passing optical energy from input ports 1127 to output ports 1130. Let the remaining intermediate switch sets 1114 be configured to be ON in their=states, passing optical energy from input ports 1126 to output ports 1130 and from input ports 1128 to output ports 1132, and OFF in their X states, passing optical energy from input ports 1126 to output ports 1132 and from input ports 1128 to output ports 1130. Let switch sets 1116 and 1166 be 2×2 switches, with idle upper output ports, that are configured to be ON in their=states, passing optical energy from input ports 1136 or 1176 to output ports 1142 or 1182, and off in their X states, passing optical energy from input ports 1134 or 1174 to output ports 1142 or 1182. Then optical energy entering matrix 1100 via any input waveguide travels along a row of matrix 1100 until diverted to a diagonal of matrix 1100 by an ON switch set 1112, 1114 or 1116. The following table shows which switch sets must be turned ON to achieve desired connectivity between input waveguides 118 and output waveguides 120.

|  | 1118a | 1118b | 1118c | 1118d |
|---|---|---|---|---|
| 1120a | 1116a | 1112b | 1114ca | 1114db |
| 1120b | 1114ab, 1166b | 1116b, 1166b | 1112c | 1114da |
| 1120c | 1114aa, 1166c | 1114bb, 1166c | 1116c, 1166c | 1112d |
| 1120d | 1112a | 1114ba | 1114cb | 1116d |

Unlike the switching algorithm for matrix 100, which always requires only one switch to be turned ON, the switching algorithm for matrix 1100 sometimes requires two switches to be turned on. The advantage of matrix 1100 over matrix 100 is that, whereas all the connections in matrix 100 traverse four switch sets, some of the connections in matrix 1100 traverse fewer than four switch sets. Specifically, the connection from input waveguide 1118*d* to output waveguide 1120*c* traverses only two switch sets (1112*d* and 1166*c*), the connection from input waveguide 1118*c* to output waveguide 1120*b* traverses only three switch sets (1112*c*, 1114*d* a and 1166*b*), and the connection from input waveguide 1118*d* to output waveguide 1118*b* traverses only three switch sets (1112*d*, 1114*d* a and 1166*b*).

In general, in an optical switch matrix, such as matrix 1100, for connecting N input waveguides to N output waveguides, there are L<N−1 rows with first, intermediate, penultimate and final switch sets, and N-L rows with only first, intermediate and penultimate switch sets. Specifically, the first N-L−1 rows and the last row have only first, intermediate and penultimate switch sets, and the remaining rows have all four kinds of switch sets. The lower output ports of the first L switch sets of the last row are optically coupled to the upper input ports of the final switch sets, in reverse order: the lower output port of the first switch set of the last row is optically coupled to the upper input port of the last switch set of the next-to-last row, the lower output port of the first intermediate switch set of the last row is optically coupled to the upper input port of the last switch set of the second-to-last row, the lower output port of the second intermediate switch set of the last row is optically coupled to the upper input port of the last switch set of the third-to-last row, etc.

While the invention has been described with respect to a limited number of embodiments, it will be appreciated that many variations, modifications and other applications of the invention may be made.

What is claimed is:

1. An optical switch matrix comprising:
   (a) N input waveguides, N being an integer greater than 2;
   (b) M output waveguides, M being an integer greater than 2; and
   (c) K rows of switch sets, where K is a larger of M and N, including:
      (i) a first said switch set having at least one input port and two output ports,
      (ii) a last said switch set having two input ports and at least one output port, and
      (iii) L−2 intermediate said switch sets, where L is a lesser of M and N, each said intermediate switch set having two input ports and two output ports;
   wherein one of said at least one input ports of each of N of said first switch sets is optically coupled to a respective said input waveguide;
   wherein one of said at least one output ports of each of M of said last switch sets is optically coupled to a respective said output waveguide;
   wherein, for each said row, for each said switch set other than said last switch set, a first said output port of said each switch set is optically coupled via a first respective intermediate waveguide to a respective said input port of a succeeding said switch set, and a second said output port is optically coupled via a second respective intermediate waveguide to a respective said input port of a respective switch set of a cyclically succeeding said row; and
   wherein, for each said row other than a last said row: for each said switch set other than said last switch set, said first and second intermediate waveguides avoid each other.

2. The optical switch matrix of claim 1, wherein M is greater than N, and wherein N of said last switch sets have only one said output port and M-N of said last switch sets have two said output ports, one of said two output ports of each of said M-N last switch sets being optically coupled via a respective intermediate waveguide to a respective said input port of a respective switch set of a cyclically succeeding row.

3. The optical switch matrix of claim 2, wherein each of said N last switch sets that have said only output ports includes a 2×1 combiner.

4. The optical switch matrix of claim 1, wherein N is greater than M, and wherein M of said first switch sets have only one said input port and N-M of said first switch sets have two said input ports, one of said two input ports of each of said N-M first switch sets being optically coupled via a respective intermediate waveguide to a respective said output port of a respective switch set of a cyclically preceding row.

5. The optical switch matrix of claim 4, wherein each of said M first switch sets that have said only output ports includes an active 1×2 splitter.

6. The optical switch matrix of claim 1, wherein M equals N and wherein each of said last switch sets includes a 2×1 combiner.

7. The optical switch matrix of claim 1, wherein each said first switch set includes a single active 1×2 splitter.

8. The optical switch matrix of claim 1, wherein each said intermediate switch set includes a single 2×2 switch.

9. The optical switch matrix of claim 8, wherein said 2×1 combiners are active.

10. The optical switch matrix of claim 1, wherein each said intermediate switch set includes:
    (i) an active 1×2 splitter having one input port and two output ports; and
    (ii) a 2×1 combiner having two input ports and one output port;
    a first of said two output ports of said 1×2 splitter of said each intermediate switch being optically coupled to a first of said two input ports of said 2×1 combiner of said each intermediate switch set.

11. The optical switch matrix of claim 10, wherein a first said output port of said each intermediate switch set is optically coupled to a second of said output ports of said 1×2 splitter, and a second said output port of said each intermediate switch set is optically coupled to said output port of said 2×1 combiner.

12. The optical switch matrix of claim 11, wherein said respective input port of said each intermediate switch set, whereto said first output port of said preceding switch set is connected, is optically coupled to said input port of said 1×2 splitter, and wherein said respective input port of said each intermediate switch set, whereto said second output port of said respective switch set of said cyclically preceding row is connected, is optically coupled-to a second of said two input ports of said 2×1 combiner.

13. The optical switch matrix of claim 12, wherein said respective input port of said each intermediate switch set, whereto said first output port of said preceding switch set is connected, is optically coupled to a second of said two input ports of said 2×1 combiner, and wherein said respective input port of said each intermediate switch set, whereto said second output port of said respective switch set of said cyclically preceding row is connected, is optically coupled to said input port of said 1×2 splitter.

14. The optical switch matrix of claim 10, wherein a first said output port of said each intermediate switch set is optically coupled to said output port of said 2×1 combiner and a second said output port of said each intermediate switch set is optically coupled to a second of said two output ports of said 1×2 splitter.

15. The optical switch matrix of claim 1, wherein each said first switch set includes:
    (i) an active 1×2 splitter having one input port and two output ports; and
    (ii) a 2×1 combiner having two input ports and one output port;
    a first of said two output ports of said 1×2 splitter of said each first switch set being optically coupled to a first of said two input ports of said 2×1 combiner of said each first switch set and a second of said two input ports of said 2×1 combiner of said each first switch set being idle.

16. The optical switch matrix of claim 15, wherein said 2×1 combiners are active.

17. The optical switch matrix of claim 15, wherein said input port of said each first switch set is optically coupled to said input port of said 1×2 splitter thereof, wherein a first said output port of said each first switch set is optically coupled to a second of said output ports of said 1×2 splitter thereof, and wherein a second said output port of said each first switch set is optically coupled to said output port of said 2×1 combiner thereof.

18. The optical switch matrix of claim 1, wherein each of N of said last switch sets includes:
 (i) an active 1×2 splitter having one input port and two output ports; and
 (ii) a 2×1 combiner having two input ports and one output port;
a first of said two output ports of said 1×2 splitter of said each last switch set being optically coupled to a first of said two input ports of said 2×1 combiner of said each last switch set and a second of said two output ports of said 1×2 splitter of said each last switch set being idle.

19. The optical switch matrix of claim 18, wherein said 2×1 combiners are active.

20. The optical switch matrix of claim 18, wherein a first said input port of said each last switch set is optically coupled to said input port of said 1×2 splitter thereof, wherein a second said input port of said each last switch set is optically coupled to a second of said input ports of said 2×1 combiner thereof, and wherein said output port of said each last switch set is optically coupled to said output port of said 2×1 combiner thereof.

21. The optical switch matrix of claim 1, wherein, for each said row, for said each switch set other than said last switch set, said first output port of said each switch set is optically coupled to said respective input port of said succeeding switch set by a single said first respective intermediate waveguide, and said second output port is optically coupled to said respective input port of said respective switch set of said cyclically succeeding row by a single said second respective intermediate waveguide.

22. The optical switch matrix of claim 1, wherein all said intermediate waveguides avoid each other.

23. The optical switch matrix of claim 22, fabricated on a face of a cylindrical substrate.

24. The optical switch matrix of claim 22, fabricated on a side of a cylindrical substrate.

25. The optical switch matrix of claim 22, wherein, for one of said rows, said second intermediate waveguides, that couple said one row to said cyclically succeeding row thereof, cross said input waveguides.

26. The optical switch matrix of claim 22, wherein, for one of said rows, said second intermediate waveguides, that couple said one row to said cyclically succeeding row thereof, cross said output waveguides.

27. The optical switch matrix of claim 22, wherein all said waveguides avoid each other.

28. An optical switch matrix comprising:
 (a) N input waveguides, N being an integer greater than 2;
 (b) N output waveguides; and
 (c) N rows of switch sets, all N said rows including:
  (i) a first said switch set having one input port and two output ports, said input port of said first switch set being optically coupled to a respective said input waveguide,
  (ii) a penultimate said switch set having two input ports and one output port, said output port of said penultimate switch set of a last said row being optically coupled to a respective said output waveguide, and
  (iii) N−2 intermediate said switch sets, each said intermediate switch set having at least one input port and two output ports, said intermediate switch sets and said penultimate switch set of each of a last N−1 said rows each having two said input ports, each of a last L of a first N−1 said rows, where L is an integer less than N−1, further including:
  (iv) a last switch set having two input ports and one output port, said output port of said last switch set being optically coupled to a respective said output waveguide, a first said input port of said last switch set being optically coupled to said output port of said penultimate switch set of said each row;
wherein said output ports of said penultimate switch sets of a first N−L−1 of said rows are optically coupled to respective said output waveguides;
wherein, for each said row, for each said switch set selected from the group consisting of said first switch set of said each row and said N−2 intermediate switch sets of said each row, a first said output port of said each switch set is optically coupled via a first respective intermediate waveguide to a respective said input port of a succeeding said switch set;
wherein, for each of said first N−1 rows, for each said switch set selected from the group consisting of said first switch set of said each row and said N−2 intermediate switch sets of said each row, a second said output port of said each switch set is optically coupled via a second respective intermediate waveguide to a respective said input port of a respective switch of a succeeding row; and
wherein, in said last row, for each of a first L said switch sets, a second said output port of said each switch set is optically coupled to a second said input port of a respective said last switch set.

29. The optical switch matrix of claim 28, wherein, in said last row, for each of N−L−1 switch sets following said first L switch sets, a second said output port of said each switch set is optically coupled via a third respective intermediate waveguide to a respective said input port of a respective switch of a first said row.

30. The optical switch matrix of claim 28, wherein said first and second intermediate waveguides avoid each other.

* * * * *